（12） United States Patent
Turner et al.

(10) Patent No.: US 11,887,178 B1
(45) Date of Patent: Jan. 30, 2024

(54) MATERIALIZATION OF A SHOPPING CART AT AN INSTANT MESSAGING PLATFORM

(71) Applicant: Stodge Inc., Scottsdale, AZ (US)

(72) Inventors: Colin Douglas Turner, Scottsdale, AZ (US); Evan Andrew Romano, Phoenix, AZ (US); Nicole Marie Perry, Oakland, CA (US); John Barott Fox, Denver, CO (US); Nathan Patrick Killea, Greensboro, NC (US); Mark Robert Sullivan, Chicago, IL (US); Rohan Bhatia, Toronto (CA); David Dennison Lacho, Winnipeg (CA); Tyler Jameson Reiff, St. Petersburg, FL (US); Alexander Nathan Seibel, Austin, TX (US); Steadman Stoness Dinning, Puslinch (CA); Owen David Romano, Aurora (CA)

(73) Assignee: Stodge Inc., Scottsdale, AZ (US)

( * ) Notice: Subject to any disclaimer, the term of this patent is extended or adjusted under 35 U.S.C. 154(b) by 0 days.

(21) Appl. No.: 18/175,803

(22) Filed: Feb. 28, 2023

(51) Int. Cl.
*G06Q 30/00* (2023.01)
*G06Q 30/0601* (2023.01)
*H04L 51/046* (2022.01)

(52) U.S. Cl.
CPC ....... *G06Q 30/0633* (2013.01); *H04L 51/046* (2013.01)

(58) Field of Classification Search
CPC .... G06Q 30/00; G06Q 30/06; G06Q 30/0601; G06Q 30/0623; G06Q 30/0625; G06Q 30/0633; G06Q 30/0641
See application file for complete search history.

(56) References Cited

U.S. PATENT DOCUMENTS 6,731,788 B1 * 5/2004 Agnihotri .............. G11B 27/28
                                                                        382/165
8,458,053 B1 * 6/2013 Buron ................ H04N 21/4316
                                                                        705/26.1
(Continued)

OTHER PUBLICATIONS

Yi, Haibo. "Securing instant messaging based on blockchain with machine learning." Safety Science 120 (2019): 6-13. (Year: 2019).*

(Continued)

*Primary Examiner* — Christopher B Seibert
(74) *Attorney, Agent, or Firm* — Fenwick & West LLP

(57) ABSTRACT

A message management platform receives API payloads including past confirmed transactions carried out by an application builder platform and available item offerings of an application operator. The message management platform launches, at an instant messaging platform, a chat session between an agent and a user, a subscriber to the message management platform and an end-user of the application operator. The message management platform displays, for the agent, at the instant messaging platform, the past confirmed transactions of the user and the available item offerings of the application operator. The message management platform receives a selection of a set of items from the agent based on the chat session with the user and creates a virtual instance of a shopping cart representation. The message management platform generates a materialization link of the shopping cart and transmits the materialization link to the user through the instant messaging platform.

20 Claims, 14 Drawing Sheets

(56) References Cited

U.S. PATENT DOCUMENTS

| | | | | |
|---|---|---|---|---|
| 8,660,912 B1* | 2/2014 | Dandekar | ............... | G06Q 30/02 |
| | | | | 705/26.1 |
| 8,977,554 B1* | 3/2015 | Hertschuh | .......... | G06Q 30/0623 |
| | | | | 704/270 |
| 9,191,615 B1* | 11/2015 | Valimaki | ................ | H04N 7/141 |
| 2007/0050406 A1* | 3/2007 | Byers | ..................... | G06F 16/48 |
| 2007/0106570 A1* | 5/2007 | Hartman | ............ | G06Q 30/0633 |
| | | | | 705/26.8 |
| 2007/0112647 A1* | 5/2007 | Borders | ............... | G06Q 30/016 |
| | | | | 705/26.81 |
| 2007/0294240 A1* | 12/2007 | Steele | ................... | G06F 16/338 |
| | | | | 707/999.005 |
| 2009/0037291 A1* | 2/2009 | Dawson | ............. | G06Q 30/0603 |
| | | | | 705/27.2 |
| 2010/0114654 A1* | 5/2010 | Lukose | .............. | G06Q 30/0256 |
| | | | | 705/14.54 |
| 2012/0136756 A1* | 5/2012 | Jitkoff | ................ | G06F 16/9577 |
| | | | | 715/224 |
| 2012/0233020 A1* | 9/2012 | Eberstadt | ............ | G06Q 30/06 |
| | | | | 705/26.1 |
| 2012/0323656 A1* | 12/2012 | Leach | ................ | G06Q 30/0239 |
| | | | | 705/14.1 |
| 2013/0013427 A1* | 1/2013 | Gonsalves | ............ | G06Q 30/02 |
| | | | | 705/27.1 |
| 2014/0136334 A1* | 5/2014 | Lagassey | ............ | G06Q 30/0277 |
| | | | | 705/14.69 |
| 2014/0136990 A1* | 5/2014 | Gonnen | .................. | H04L 51/18 |
| | | | | 715/752 |
| 2014/0297362 A1* | 10/2014 | Kumar | ............... | G06Q 30/0253 |
| | | | | 705/7.29 |
| 2014/0297537 A1* | 10/2014 | Kassemi | ................. | H04L 51/08 |
| | | | | 705/67 |
| 2015/0052061 A1* | 2/2015 | Anderson | ............ | G06Q 20/409 |
| | | | | 705/44 |
| 2015/0088686 A1* | 3/2015 | Glassberg | .............. | G06Q 50/01 |
| | | | | 705/26.8 |
| 2015/0149168 A1* | 5/2015 | Stent | ....................... | G10L 15/22 |
| | | | | 704/235 |
| 2015/0317698 A1* | 11/2015 | Kalyvas | ............. | G06Q 30/0214 |
| | | | | 705/14.66 |
| 2021/0174221 A1* | 6/2021 | Vijapur Gopinath Rao | ................ | |
| | | | | G06N 20/00 |
| 2021/0360027 A1* | 11/2021 | Boyer | .................. | H04L 51/046 |

OTHER PUBLICATIONS

Okuyama, VYouji Kohda VHiroyasu Sugano VSatoshi. "IMPP: A New Instant Messaging Standard and Its Impact on Internet Business." FUJITSU Sci. Tech. J 36.2 (2000): 147-153. (Year: 2000).*

* cited by examiner

260 →
```
{
  "time_created": "2022-10-07T09:21:52",
  "id": 3948249,
  "body": {...},  ← 270
  "description": "Order Shipped",
  "order_id": 231098434,
  "subject_type": "Shipment",
  ...
}
```
262

```
  "body": {
272 →  "app_identifier" : 1249032235
274 →  "IP_address": 342.213.23.102
    ...
    "customer":
282 →   {
    "id": 207119551,
284 →   "email": "john.doe@abc.com",
286 →   "phone": "+16507778888",
        ...
    },
    ...
292 →  "order":
    {
294 →   "items" = ["item_id": 34295493, "item_id": 32546556, ...]
    ...
    }
    ...
  }
```
270

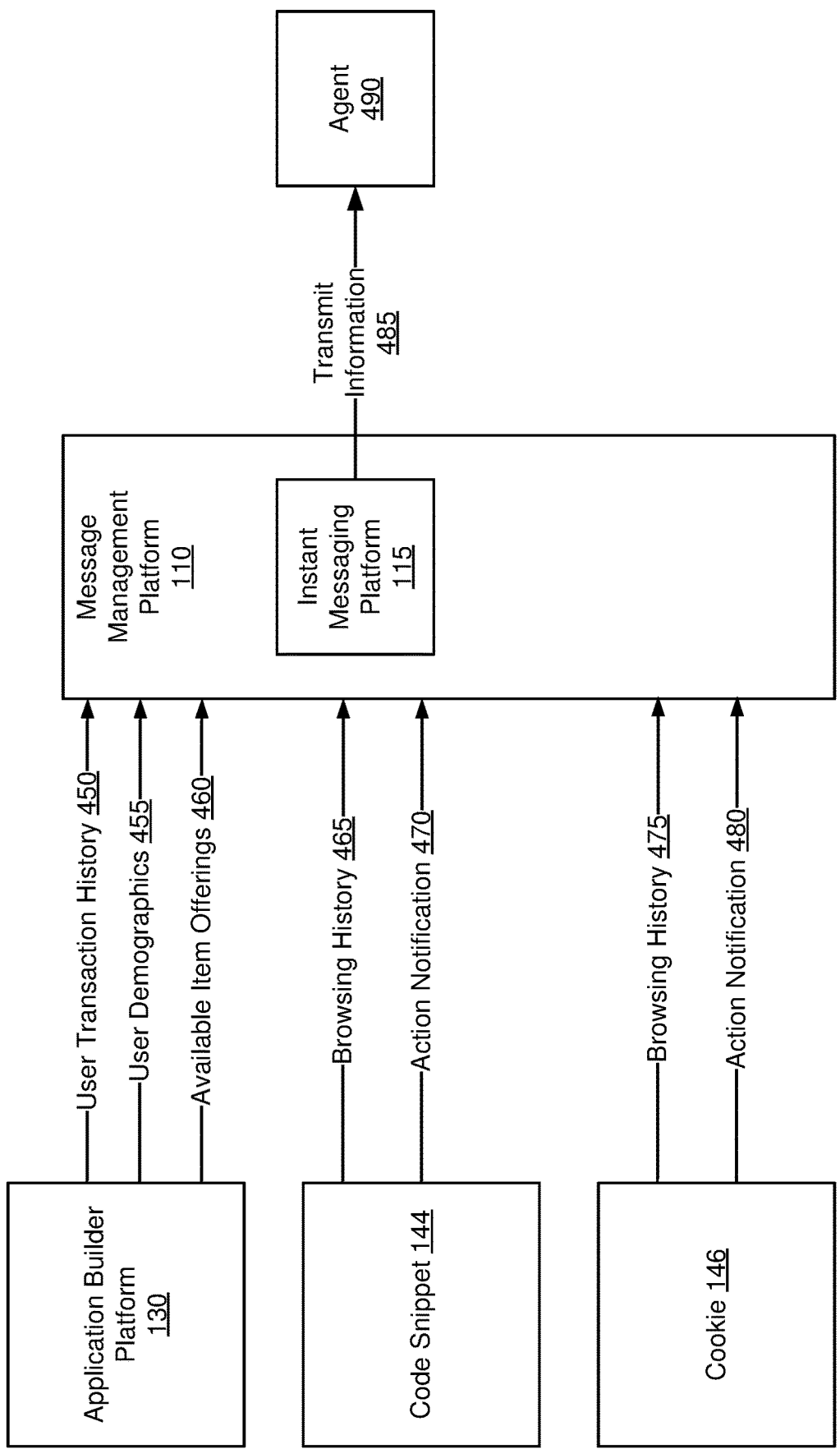

MATERIALIZATION OF A SHOPPING CART AT AN INSTANT MESSAGING PLATFORM

TECHNICAL FIELD

The present disclosure generally relates to materializing a shopping cart in an instant messaging platform.

BACKGROUND

An organization, as part of a customer service strategy, may employ instant messaging communication between a customer service agent and a user of a service provided by the organization. However, the agent's ability to assist the user is limited to what they can do through an instant messaging platform. The agent, via instant messaging, may be able to advise or instruct the user on what to do with the organization's service but may themselves be unable to perform tasks on behalf of the user. Moreover, for instant messaging services like SMS, individual messages may be limited in character count. As such, it may be particularly difficult for the agent to generate more complex instructions, such as instructions to browse an interface, through SMS.

SUMMARY

One way an agent may be better able to assist a user in using an organization's service through an instant messaging platform is through the materialization of a shopping cart at the instant messaging platform.

Embodiments are related to using materializing a shopping cart for an application operator at an instant messaging platform. In one or more embodiments, a message management platform receives application programming interface (API) payloads from an application builder platform that provides a backend merchant component for an application operator. The API payloads comprise of past confirmed transactions carried out by the application builder platform and available item offerings of the application operator. The message management platform launches, at an instant messaging platform, a chat session between an agent of the message management platform and a user. The user is a subscriber to the message management platform and an end-user of the application operator. The message management platform displays, for the agent, at the instant messaging platform, the past confirmed transactions of the user and the available item offerings of the application operator. The message management platform receives a selection of a set of items from the agent based on the chat session with the user and creates a virtual instance of a shopping cart representation. The message management platform generates a materialization link of the shopping cart and transmits the materialization link to the user through the instant messaging platform.

BRIEF DESCRIPTION OF THE DRAWINGS

Figure (FIG. 1 is a block diagram illustrating an example system environment, in accordance with some embodiments.

FIG. 2B is a conceptual diagram illustrating an example payload of an API notification, such as a webhook notification, provided by the application builder platform, in accordance with some embodiments.

FIG. 4 is a block diagram illustrating types of information the message management platform may receive from the application builder platform, a code snippet, or a cookie.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Disclosed embodiments herein are related to a message management platform that allows agents associated with the message management platform to select available item offerings from a merchant system to be added to a shopping cart for a user and that materializes a shopping cart to transmit to the user. Users are end-users of the merchant system and subscribers to the message management platform who have opted-in to receive messages (e.g., SMS messages) from an agent associated with the message management platform. An agent may use the message management platform to chat with the user and to initiate the materialization of a shopping cart. The message management platform may then automatically generate and transmit the shopping cart to the user.

Example System Environment

Figure 1:
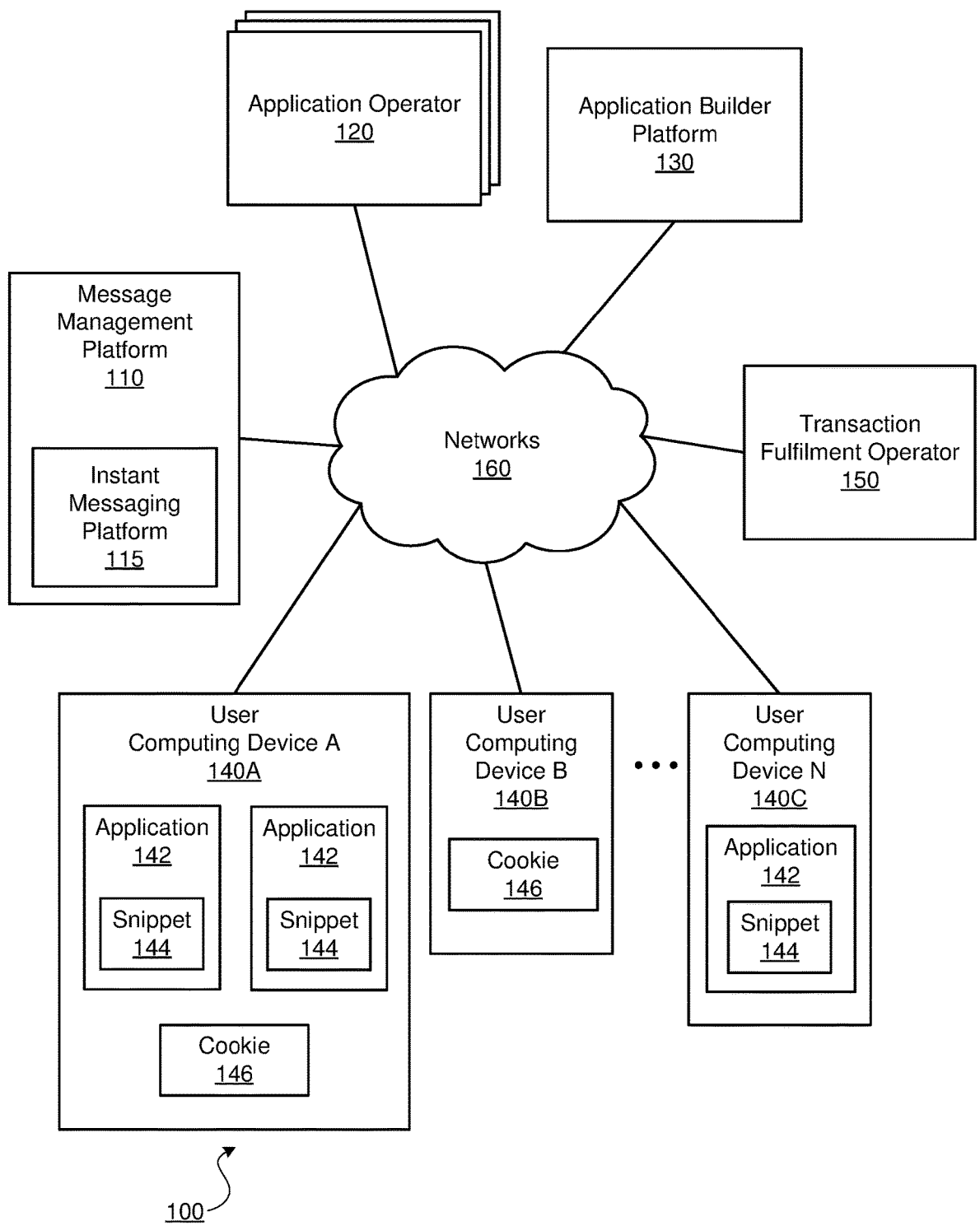

Referring now to Figure (FIG. 1, shown is a block diagram illustrating an embodiment of an example system environment 100 for materializing a shopping cart of a merchant system in an instant messaging platform on behalf of an end user, in accordance with some embodiments. By way of example, the system environment 100 includes a message management platform 110, application operators 120, an application builder platform 130, an instant messaging platform 115, user computing devices 140, and a transaction fulfillment operator 150. The user computing devices 140 may be collectively referred to by the reference number 140 or individually as 140A, 140B, . . . , 140N (N being an nth device, n being some number). The entities and components in the system environment 100 may communicate with each other through networks 160.

In various embodiments, the system environment 100 may include fewer or additional components. The system environment 100 also may include different components. Also, while some of the components in the system environment 100 may sometimes be described in a singular form, the system environment 100 may include one or more of each of the components. For example, there may be multiple application operators 120 and multiple user computing devices 140. Various application operators 120 may be independent entities such as different enterprise customers of the message management platform 110, which serves as a service provider that manages the instant messaging and associated actions on behalf of the application operators 120. Also, while the terms such as "server" and "operator" is used in the singular form, those terms may each include multiple instances that cooperatively or collectively perform certain functions or processes described in this disclosure. For example, a "server" may include a group of servers that are operated under a single entity or multiple entities under contract to provide various services. Each server in the group may perform a different function.

In the system environment 100, various components may be operated by the same entities or different entities. For example, in some embodiments, the message management platform 110, the application operator 120, the application builder platform 130, and the transaction fulfillment operator 150 are each operated by a different business. In some embodiments, two or more components may be operated by the same organization. For example, the organization that controls the application builder platform 130 may also be the transaction fulfillment operator 150.

The message management platform 110 may include one or more computing servers that perform various tasks related to managing communication elements (messages, data payloads, and other forms of communications) on behalf of application operators 120. The message management platform 110 may refer to the party that operates the message management platform 110. The communication managing tasks may include providing a frontend software platform (e.g., a message flow builder in the form of a software-as-a-service SaaS platform), transmitting communication elements to various user computing devices 140 on behalf of the different application operators 120, determining conditions and target audience to transmit those communications, transmitting a series of messages based on triggered conditions, receiving responses from user computing devices 140, forwarding the responses to the application operators 120, and/or taking actions on behalf of the application operators 120.

US Patent Application Publication No. 2022/0198431, entitled "Text Messaging Service Based Commerce System," published on Jun. 23, 2022, is incorporated herein by reference for all purposes.

The messages managed and distributed by the message management platform 110 may include different types of messages such as text messaging services (e.g., short message service (SMS), multimedia messaging service (MMS)), emails (e.g., mobile emails, plain text emails, browser emails), push notification protocols (e.g., APPLE push notification, ANDROID push notification), instant messaging applications (WHATSAPP, WECHAT, TELEGRAM), in-application messages (e.g., messages sent within a mobile application), social networking systems (e.g., FACEBOOK, TWITTER), RSS feeds, web browser notifications, other suitable protocols such as simply message payloads sent as an Internet packet or a series of packets. In some embodiments, the message management platform 110 may focus on a single type of message such as a text messaging service (SMS and MMS). In some embodiments, the message management platform 110 may also be an SMS management platform that provides SMS subscription service on behalf of application operations 120 and also provides an instant messaging platform 115 for agents of the application operator 120 to chat with SMS subscribers via SMS.

By way of example, the message management platform 110 may provide the instant messaging platform 115 that connects an agent (e.g., a customer service agent) and the user computing device 140 to allow the two parties to communicate via instant messaging (e.g., SMS) in real time. The message management platform 110 may receive SMS messages from the user computing device 140 and display the SMS messages as a chat in the instant messaging platform 115. The message management platform 110 may receive data associated with a user, such as past confirmed transactions between the user and a merchant system that is operated by an application operator 120. The message management platform 110 may transmit, to the user, a virtual instance of a shopping cart link via an SMS message. While SMS messaging may be used as the primary example throughout this disclosure, various features described may be expanded to other types of communications.

The message management platform 110 may be operated by an entity that uses a combination of hardware and software to build and operate the platform. A computing server used by the message management platform 110 may include some or all example components of a computing machine described in FIG. 10. The message management platform 110 may sometimes be referred to as a messaging platform or simply a computing server. The message management platform 110 may include a computing server that takes different forms. In some embodiments, the message management platform 110 may be a server computer that executes code instructions to perform various processes described herein. In some embodiments, the message management platform 110 may be a pool of computing devices that may be located at the same geographical location (e.g., a server room) or be distributed geographically (e.g., cloud-ing computing, distributed computing, or in a virtual server network). In some embodiments, the message management platform 110 may be a collection of servers that cooperatively provide messaging services as described. The message management platform 110 may also include one or more virtualization instances such as a container, a virtual machine, a virtual private server, a virtual kernel, or another suitable virtualization instance. The message management platform 110 may provide application operators 120 with various message management services and merchant services as a form of cloud-based software, such as software as a service (SaaS), through the network 160. Examples of components and functionalities of the message management platform 110 are discussed in further detail below with reference to FIG. 3.

Application operators 120 are entities that control software applications 142 that are used by user computing devices 140. For example, an application operator 120 can be an application publisher that publishes mobile applications available through application stores (e.g., APPLE APP STORE, ANDROID STORE). In some cases, the application may take the form of a website and the application operator 120 is the website owner. In some embodiments, the application operators 120 are businesses that provide goods and/or services to end users who possess the user computing devices 140. In some embodiments, an application operator 120 sells products through an application 142 and may be referred to as a merchant. In the system environment 100, the application operators 120 may be the customers of the message management platform 110 and the customers of the application builder platform 130.

An application operator 120 may interact directly with its end users in certain aspects, and may delegate certain operations, such as sending messages, to the message management platform 110. An application operator 120 may maintain accounts of its users and manage day-to-day interactions with the users while directing the message management platform 110 to distribute messages to the users on behalf of the application operator 120. For example, the application operator 120 may use a platform provided by the message management platform 110 to design messages and set conditions, branches, and intended recipients of the messages. The application operator 120, through the message management platform 110, may launch a message flow that includes a series of messages to be automatically delivered to various user computing devices 140.

By way of example, an application operator 120 may be a retail business that operates an electronic retail platform in an application 142 and uses the service of the message management platform 110 to communicate order and shipment information to various user computing devices 140. In another example, another retail business may use the message management platform 110 to transmit marketing and promotional communications (e.g., advertisements, gift cards, coupons, store credits, and receipts) in various forms of messages to user computing devices 140. In yet another example, an application operator 120 may be a retail company that hires the message management platform 110 to send SMS offers to its customers and the customers may make a purchase by directly responding to the SMS message. These are non-exhaustive examples of application operators 120. Various application operators 120 may be independent and unrelated entities, such as different unrelated businesses.

In some embodiments, a message may be considered to be transmitted from the application operator 120 regardless of whether the message publisher's server directly sends the message or the message management platform 110 sends the message on behalf of the application operator 120.

An instant messaging platform 115 may be a platform provided by message management platform 110 for an agent to communicate with an end user. The agent may be a robotic agent or a natural person agent who may be controlled by the message management platform 110 or by an application operator 120. For example, the message management platform 110 may handle customer service communication on behalf of an application operator 120. The message management platform 110 provides its own agents in handling the customer service. In another situation, the message management platform 110 may be a SaaS provider and the customer service agents who work at the application operator 120 may use the instant messaging platform 115 provided by the message management platform 110 to communicate with end users.

Figure 7:
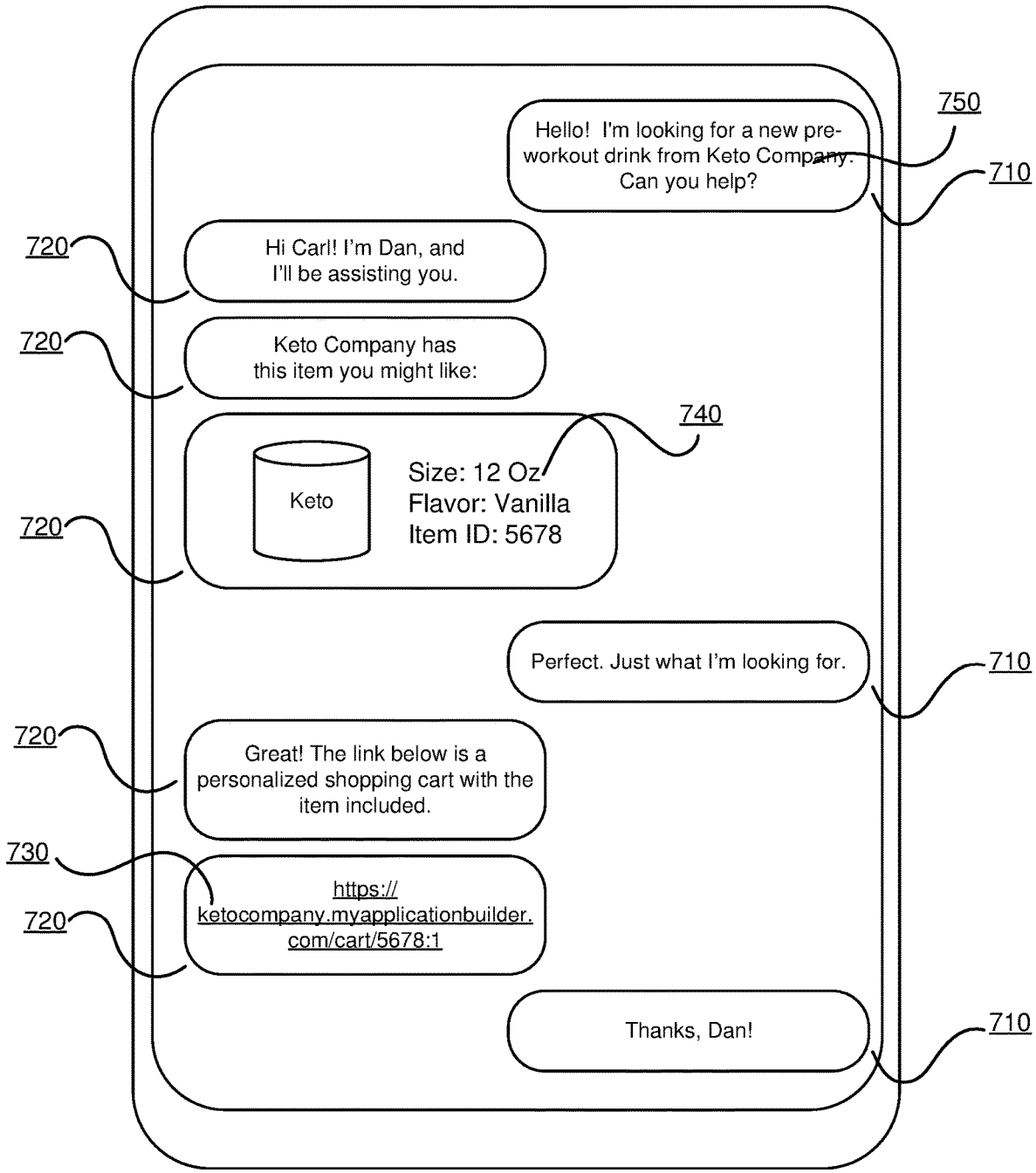
FIG. 7 shows an example SMS interaction between the agent of the message management platform and the user of the user computing device, in accordance with some embodiments.

The instant messaging platform 115 may provide a user interface (UI) that is non-parallel between the agent and the end user. In some embodiments, the UI is only available to the agent while the end user may have a different experience. For example, the UI may include purchase history of the end user that is viewable by the agent while the end user is using an SMS platform. An example SMS platform interaction is shown in FIG. 7. Hence, from the perspective of the end user, the end user uses an SMS platform to communicate with the application operator 120. The instant messaging platform 115 provides more information and functionalities for the agent to better handle the requests from the end user.

An application builder platform 130 may include one or more computing servers that perform various tasks related to assisting application operators 120 to build applications 142, providing ready-to-use functionalities to those applications 142, operating a digital distribution platform that provides a selection of third-party functionalities that can be integrated into applications 142, providing back-end functionalities for applications 142, and/or performing actions such as fulfillment for transactions that are completed through applications 142. The application builder platform 130 may refer to the party that operates the application builder platform 130. By way of example, the application builder platform 130 may be an e-commerce platform, such as SHOPIFY, that allows application operators 120 to build an application 142, which may take the form of a mobile application, a website, or a software program, on the platform of the application builder platform 130. The application builder platform 130 may also be referred to as an e-commerce platform, a backend shopping cart platform, or a website builder platform.

The application 142 built using the platform may automatically incorporate certain standard features provided by the application builder platform 130, such as the checkout feature, shopping cart, payment management, and inventory management features provided by the application builder platform 130. Hence, the application operator 120 may design, for example, a website using the platform and the website will automatically have e-commerce features. The application builder platform 130 may further provide a digital distribution platform on which various third-party features are distributed. In some embodiments, the message management platform 110 may upload a code snippet (e.g., in the form of an applet, a software development kit (SDK)) to the digital distribution platform. An application operator 120 adding the applet to the application 142 makes the application 142 have additional features that are provided by the applet in communication with the message management platform 110.

With respect to the relationship between the application operator 120 and the application builder platform 130, while the application operator 120 is the operator of an application 142, the application operator 120 may not need to run the application in terms of the application's day-to-day software and hardware operations. The application operator 120 may control the application 142 in the business sense, such as being the owner of the application 142. For example, a retail merchant application operator 120 may own its retail website or retail mobile application. However, an application operator 120 may delegate the application's day-to-day software and hardware operations to the application builder platform 130. As such, in some embodiments, an application operator 120 may also be referred to as an application owner, an application publisher, a business, a service provider, and/or a merchant. In some embodiments, the application operator 120 may run some part of the day-to-day software and hardware operations of its application 142 while the application builder platform 130 provides support and additional features (e.g., e-commerce capability, backend, and platform) to the application 142.

The application builder platform 130 may be operated by an entity that uses a combination of hardware and software to build and operate the platform. The application builder platform 130 may include some or all example components of a computing machine described in FIG. 10. The application builder platform 130 may sometimes be referred to as a website builder server, an e-commerce platform, an online-store building platform, or simply a computing server. The application builder platform 130 may include a computing server that takes different forms. In some embodiments, the application builder platform 130 may be a server computer that executes code instructions to perform various processes described herein. In some embodiments, the application builder platform 130 may be a pool of computing devices that may be located at the same geographical location (e.g., a server room) or be distributed geographically (e.g., clouding computing, distributed computing, or in a virtual server network). In some embodiments, the application builder platform 130 may be a collection of servers. The application builder platform 130 may also include one or more virtualization instances such as a container, a virtual machine, a virtual private server, a virtual kernel, or another suitable virtualization instance. Examples of components and functionalities of the application builder platform 130 are discussed in further detail below with reference to FIG. 2A.

A user computing device 140 is a computing device that is possessed by an end user who may be a customer or a subscriber of an application operator 120. An end user may perform transactions, such as purchases, service arrangement, and communications, with the application operator 120 through the application 142 that is operated by the application operator 120 with some features that may be provided or supported by the application builder platform 130. An end user may also receive messages from the message management platform 110 or from an agent associated with the message management platform 110 that are related to an application operator 120. For example, the end user may initiate a chat session with the application operator 120, and the message management platform 110 or agent may engage in the chat session with the end user on behalf of the application operator 120.

Examples of user computing devices 140 include personal computers (PC), desktop computers, laptop computers, tablets (e.g., iPADs), smartphones, wearable electronic devices such as smartwatches, smart home appliances (e.g., smart home hubs and controllers), vehicle computer systems, or any other suitable electronic devices. In some embodiments, for a message management platform 110 that specializes in SMS messages, user computing devices 140 may be any mobile devices (e.g., phones, tablets) that are equipped with Subscriber Identity Module (SIM) cards, electronic or physical, and/or are associated with phone numbers.

Some of the user computing devices 140 may run one or more applications 142 that are developed by various application operators 120 using the application builder platform 130. For example, the user may download various mobile apps and visit different websites that are operated by various businesses. Each instance of the mobile app and website may be an example of an application 142. Each application 142 may be developed by different creators. For example, in some embodiments, a first application 142 is developed by a first application operator 120 and a second application 142 is developed by a second application operator 120.

Various applications 142 may take different forms. For example, some applications may take the form of webpages that have backend functionalities built using JAVASCRIPT, RUBY ON RAIL, etc. Other applications may be web applications that may appear as SaaS platforms. Yet other applications may be mobile apps that may run on Swift for iOS and other APPLE operating systems or on Java or another suitable language for ANDROID systems. In another case, an application 142 may be a software program that operates on a desktop computer that runs on an operating system such as LINUX, MICROSOFT WINDOWS, MAC OS, or CHROME OS.

An application 142 may incorporate a code snippet 144 that is provided by the message management platform 110 to enable the application 142 to include functionalities provided by the message management platform 110. In some embodiments, the incorporation may be performed through the digital distribution platform provided by the application builder platform 130. An application operator 120 may select the code snippet 144 of the message management platform 110 from a list of applets at the marketplace of the digital distribution platform and the application builder platform 130 in turn provides or causes a server of the message management platform 110 to provide the code snippet 144 as part of the code of the application 142. In some embodiments, the code snippet 144 may also be incorporated at the code level. This may be done by importing one or more libraries of functions and codes of the code snippet 144 to the software code of the application 142 in the header section of the software code and having the code calling one or more functions of the code snippet 144.

While the application operator 120 primarily operates the application 142, the code snippet 144 allows the application 142 to communicate with the message management platform 110. For example, an application operator 120 may be a retail business that develops an application 142 for its customers to purchase items through the application 142. A customer may opt-in to allow the application 142 to track certain analytics, actions, browsing history, and/communications occurred associated with the application 142. The information may be captured by the code snippet 144 and forwarded to the message management platform 110. In another example, the code snippet 144 may be in communication with the message management platform 110 that generates user-tailored information (e.g., personal information, custom promotional messages) to display the information in the application 142, such as in the form of a pop-up, side panel, embedded content, or another suitable way of presentation. In various embodiments, the code snippet 144 may perform any suitable tasks, from front end features, such as providing a control element that is operated by the message management platform 110 on the frontend, to any backend functionalities.

Multiple instances of the code snippet 144 developed by the message management platform 110 may be included in different applications 142. For example, different application operators 120 may be customers of the message management platform 110 and include the code snippet 144 in the applications 142, as illustrated in the user computing device A 140A. Those applications 142 that incorporate the same type of code snippet 144 have included similar functionalities and services provided by the message management platform 110.

Some of the user computing devices 140 may store a cookie 146 that is issued by the message management platform 110. The cookie 146 is used to serve as an identifier so that the message management platform 110 may track a particular user computing device 140 and associate the instance(s) of code snippet 144 that are used in the user computing device 140 with a particular end user or a particular phone number.

The transaction fulfillment operator 150 may be an entity that completes a transaction between an end user and an application operator 120. For example, an end user may make a purchase through the application 142 which is supported by the e-commerce backend provided by the application builder platform 130. After the confirmation of the purchase, the application builder platform 130 (or the application operator 120) may transmit the detail to the transaction fulfillment operator 150 to carry out the transaction, which may include packaging and shipment. The transaction fulfillment operator 150 may provide notifications to the application builder platform 130 regarding various stages of status updates of the purchase, such as the shipment of the parcel, the delivery of the parcel, etc.

The networks 160 provide connections to the components of the system environment 100 through one or more sub-networks, which may include any combination of the local area and/or wide area networks, using both wired and/or wireless communication systems. In some embodiments, the networks 160 use standard communications technologies and/or protocols. For example, a network 160 may include communication links using technologies such as Ethernet, 802.11, worldwide interoperability for microwave access (WiMAX), 3G, 4G, Long Term Evolution (LTE), 5G, code division multiple access (CDMA), digital subscriber line (DSL), etc. Examples of network protocols used for communicating via the network 160 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over a network 160 may be represented using any suitable format, such as hypertext markup language (HTML), extensible markup language (XML), JavaScript object notation (JSON), structured query language (SQL). In some embodiments, all or some of the communication links of a network 160 may be encrypted using any suitable technique or techniques such as secure sockets layer (SSL), transport layer security (TLS), virtual private networks (VPNs), Internet Protocol security (IPsec), etc. The networks 160 also include links and packet switching networks such as the Internet.

Example Application Builder Platform Components

Figure 2A:
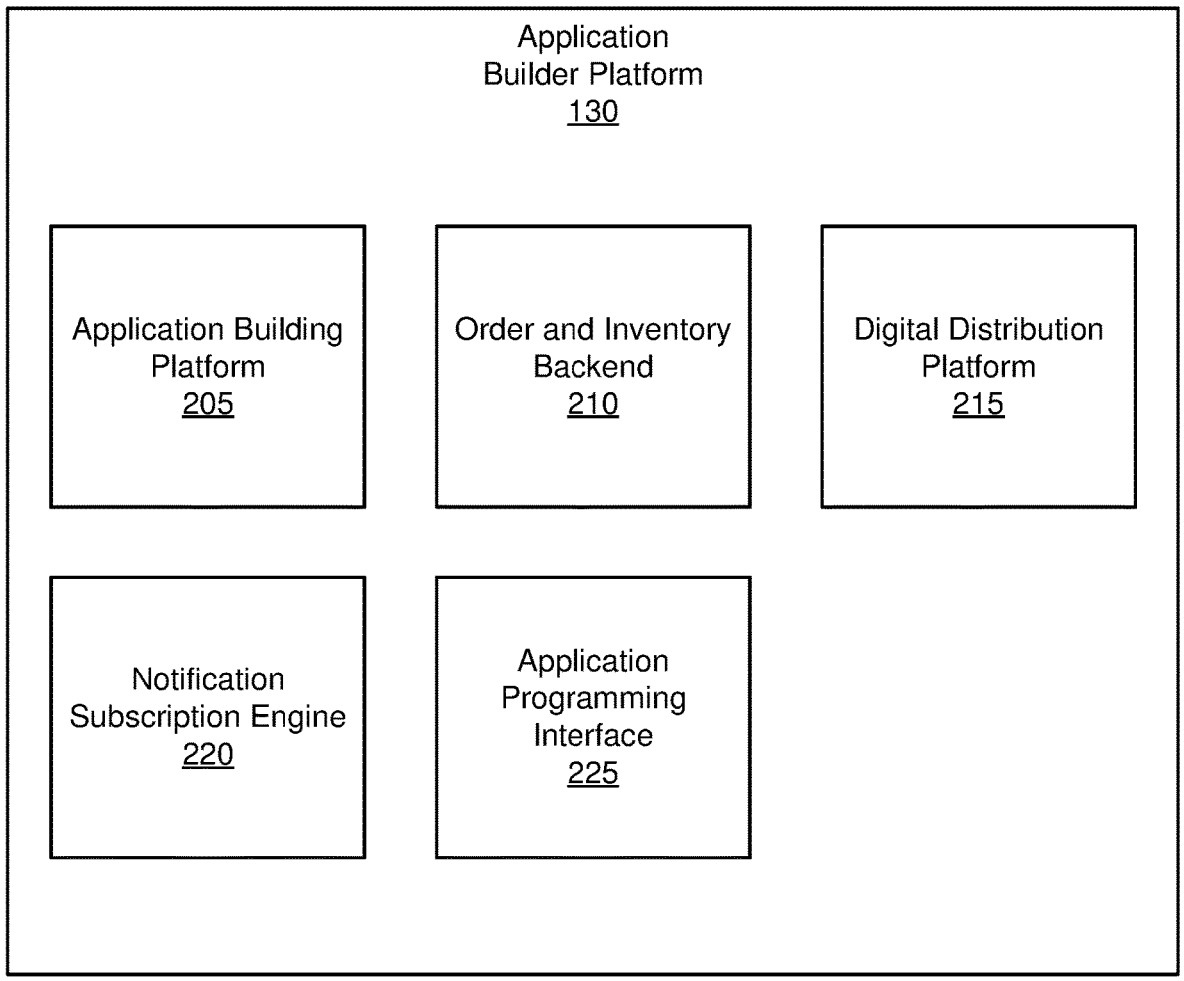
FIG. 2A is a block diagram illustrating various components of an example application builder platform, in accordance with some embodiments.

FIG. 2A is a block diagram illustrating various components of an example application builder platform 130, in accordance with some embodiments. An application builder platform 130 may include an application building platform 205, an order and inventory backend 210, a digital distribution platform 215, a notification subscription engine 220, and an application programming interface 225. In various embodiments, the application builder platform 130 may include fewer or additional components. The application builder platform 130 also may include different components. The functions of various components in application builder platform 130 may be distributed in a different manner than described below. Moreover, while each of the components in FIG. 2A may be described in a singular form, the components may present in plurality.

The application building platform 205 may take the form of a front-end software platform that allows an application operator 120 to design and configure various visual elements and functionalities of an application 142. The building of an application 142 may be based on standard language such as HTML, CSS, JAVASCRIPT, etc. The application builder platform 130 may provide certain pre-built features that allow the application operator 120 to incorporate into the application 142. The pre-built features may include an e-commerce platform, shopping cart features and related order and inventory backend 210, a search engine for the application, payment management, and analytics. As discussed in further detail below, additional features and functionalities may be selected at the digital distribution platform 215 for applets that are provided by other parties.

The order and inventory backend 210 may be a management system that allows the application operator 120 to act as a merchant to sell various goods at the application 142 and manage the inventory of those goods. For each product for a particular merchant, the application builder platform 130 may assign a unique product identifier. In some products that have sub-variants, such as apparel that have sizes and colors, the application builder platform 130 may assign a variant identifier. The order and inventory backend 210 may also allow the application operator 120 to define a taxonomy of products that have categories, levels of sub-categories, and products. The application builder platform 130 may also assign an identifier for each category or sub-category. The application builder platform 130 may include the identifier for a page in the application 142 that is related to the product, variant, category, or subcategory. For example, on the product page of the merchant application 142 that display product detail to the customers, the URL of the page or the HTML of the page may include the product identifier.

The digital distribution platform 215 may take the form of a marketplace, which may be open or semi-open, to various third-party developers to list their software applications that can be incorporated into an application 142 of an application operator 120. An application operator 120 may browse and select various applications on the digital distribution platform 215. For the applications that are selected by the application operator 120, the code of the selected applications is incorporated into the application 142 to expand the functionalities and features of the application 142. For example, the message management platform 110 may publish the code snippet 144 in the digital distribution platform 215 and an application operator 120 may incorporate the code snippet 144 into an application 142.

The notification subscription engine 220 allows an application operator 120 to subscribe to different notification channels that are provided by the application builder platform 130. The notification channels may be divided based on event types, merchants, and other suitable factors. For example, the application builder platform 130 may manage the e-commerce and sales of products on behalf of an application operator 120. The notification channels may include purchase notifications, shipment notifications, delivery notifications, etc. An application operator 120 may select one or more channels to subscribe. In some embodiments, an application operator 120 may authorize the message management platform 110 to subscribe to one or more notification channels on behalf of the application operator 120. The subscription process may include providing a credential of the application operator 120 to the application builder platform 130 through an API call. The API call includes a parameter ("purchase" for purchase events, "shipment" for shipment events) that specifies the notification channel to subscribe. After subscription, the application builder platform 130 provides notifications of a particular type of event to the recipient (the application operator 120 or the message management platform 110).

The application programming interface 225 allows the application builder platform 130 to provide notifications for recipients on subscribed channels. In some embodiments, the notifications can be provided in the form of pull notifications by conventional API in which the recipient (the application operator 120 or the message management platform 110) may continuously poll the API. In some embodiments, the notifications can be provided through webhook, which may be a form of push API notifications where the application builder platform 130 automatically transmit the API notifications to the recipient when a matching event has occurred. An API notification, such as a webhook notification, may include a header and a payload. The payload may be in the format of key-value pairs that are in the format of JSON, XML, YAML, CSV, or another suitable format.

FIG. 2B is a conceptual diagram illustrating an example payload 250 of an API notification, such as a webhook notification, provided by the application builder platform 130, in accordance with some embodiments. The payload 250 may take the form of key-value pairs. The keys and values shown in the payload 250 are for example only. In various embodiments, the payload 250 may include fewer, additional, or different keys. In some embodiments, the pairs may be nested.

The top portion of the example payload 250 may be the first level of key-value pairs and may be referred to as the wrapper 260. The wrapper 260 includes the body 270 of the payload 250 and other high-level information of the payload 250, such as the identifier of the API notification, the identifier of the order related to this notification, the subscription channel 262 of the notification (e.g., "subject _type": "Shipment") and other information. The body 270 may be another nested key-value pairs that include additional information contained in the API notification. An example body 270 is separately shown in the lower portion of FIG. 2B.

The body 270 may take the form of another layer of nested key-value pairs that include various information regarding the order, the end user, and other related identification information. In some embodiments, the body 270 may include a key for the identifier 272 of an application 142 and an IP address 274 of the user computing device 140 engaging in the transaction. The application builder platform 130 may also have the information of the end user, which is recorded in the key "customer." The information of the end user may include a unique user identifier 282, the email address 284 of the end user, and the phone number 286 of the end user. The body may further include a key for the order 292 and the value corresponding to the order 292 may include detailed information about the order 292. In some embodiments, the API notification may include an array that lists all of the items 294 in the order 292. The items 294 may be in the format of an array that includes the product or variant identifier of those items in the order 292.

Example Message Management Platform Components

Figure 3:
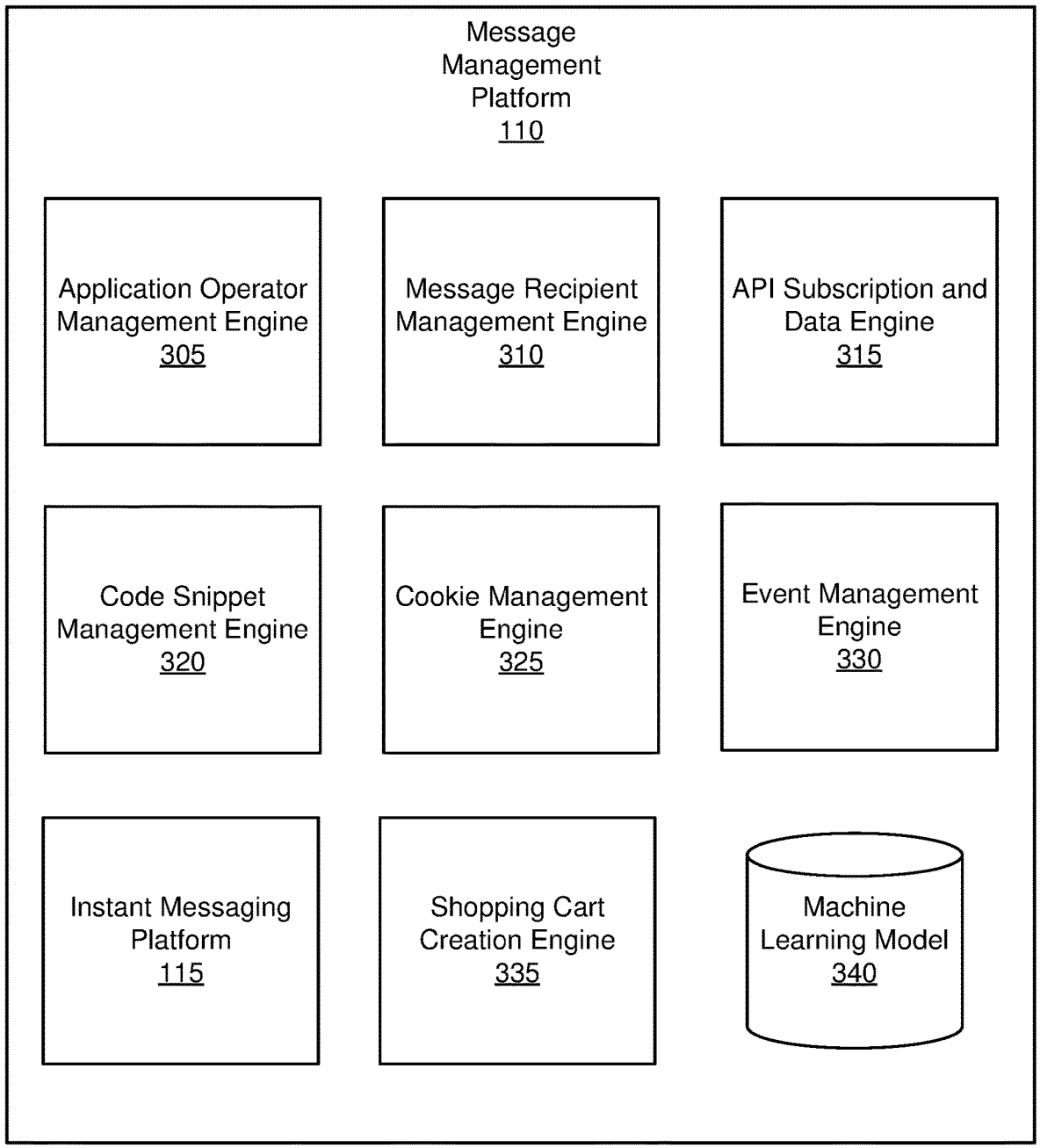
FIG. 3 is a block diagram illustrating various components of an example message management platform, in accordance with some embodiments.

FIG. 3 is a block diagram illustrating various components of an example message management platform 110, in accordance with some embodiments. A message management platform 110 may include the application operator management engine 305, a message recipient management engine 310, an API subscription and data engine 315, a code snippet management engine 320, a cookie management engine 325, an event management engine 330, an instant messaging platform 115, a shopping cart creation engine 335, and a machine learning model 340. In various embodiments, the message management platform 110 may include fewer or additional components. The message management platform 110 also may include different components. The functions of various components in message management platform 110 may be distributed in a different manner than described below. Moreover, while each of the components in FIG. 3 may be described in a singular form, the components may present in plurality.

The components of the message management platform 110 may be embodied as software engines that include code (e.g., program code comprised of instructions, machine code, etc.) that is stored on an electronic medium (e.g., memory and/or disk) and executable by a processing system (e.g., one or more processors and/or controllers). The components also could be embodied in hardware, e.g., field-programmable gate arrays (FPGAs) and/or application-specific integrated circuits (ASICs), that may include circuits alone or circuits in combination with firmware and/or software. Each component in FIG. 3 may be a combination of software code instructions and hardware such as one or more processors that execute the code instructions to perform various processes. Each component in FIG. 3 may include all or part of the example structure and configuration of the computing machine described in FIG. 10.

The application operator management engine 305 manages the profiles and credentials of application operators 120. The message management platform 110 stores the profile, metadata, and credentials of the application operator 120 and associates the information with a unique identifier. The application operator 120 may create message templates, specify criteria of message content, and goals of message content, select or specify types of events and analytics to be captured by the message management platform 110, manage subscription plans, and configure other settings with the message management platform 110. The templates and settings are associated with the identifier of the application operator 120 and can be retrieved, duplicated, edited, and deleted based on the preferences of the application operator 120 and/or API provided by the message management platform 110.

In some embodiments, the application operator management engine 305 may also store credentials or access keys of application operators 120. The application operator 120 may provide the message management platform 110 an access key, such as an API access key with a particular level of access privilege, for the message management platform 110 to subscribe to various notification channels provided by the application builder platform 130.

The message recipient management engine 310 manages the profile of end users that receive messages from the message management platform 110. An application operator or an agent associated with the message management platform may access the users' segmentation and the tags that categorize the users. For example, the agent may access a user's segmentation and tags when engaging in a chat session with the user. The message management platform 110 may associate end users based on the user computing devices 140 and/or phone numbers. An end user or the corresponding user computing device 140 may be assigned a subscriber identifier. Depending on whether a user computing device 140 is determined as possessing an application 142, a code snippet 144, and/or a cookie 146, the message recipient management engine 310 may also associate the subscriber identifier with one or more of the following: phone number, email address, device identifier, application identifier, and/or cookie identifier.

The message recipient management engine 310 may maintain tags for end users for one or more purposes such as audience segmentation. The tags may take the form of metadata tags. The tags may include information such as preferences of the user computing devices 140, opt-in or opt-out options of the user computing devices 140 (e.g., subscribed or not), and other characteristics of the message recipients, including consented information such as gender, age, interested products, interested news, etc. Based on the tags, the message recipient management engine 310 may categorize the end users into one or more groups. The message recipient management engine 310 may also store the entire records of messages and chat history of each user computing device 140, such as metadata of the messages (e.g., date and time of the messages). The message recipient management engine 310 may also store the purchases and other actions taken by the end users.

The API subscription and data engine 315 subscribes to various API notification channels (e.g., webhook channels) provided by the application builder platform 130 on behalf of application operators 120. For example, an application operator 120 authorizes the message management platform 110 to receive data form the application builder platform 130 for relevant information related to the e-commerce service of the application operator 120. In some embodiments, the API subscription and data engine 315 receives payloads 250 from the application builder platform 130 webhook.

The API subscription and data engine 315 in turn may identify the nature of each payload 250 by reviewing the notification channel type 262. Discussing FIG. 3 in conjunction with FIG. 2B, the API subscription and data engine 315 may also identify the user computing device 140 based on the application identifier 272 and device IP address 274. In some embodiments, the API subscription and data engine 315 may have a mapping of subscriber identifiers stored by message recipient management engine 310 and the user identifiers 282 used by the application builder platform 130. In such a case, the API subscription and data engine 315 may be able to immediately determine the user who is specified in payload 250. In some cases, if a particular user identifier 282 is not available in the system of message management platform 110, the API subscription and data engine 315 may inspect the email 284 and the phone number 286 to determine the user who is specified in the payload 250. The API subscription and data engine 315 may review various values in the payload 250 and in turn associate the data to user, product, and/or event records that are maintained by the message management platform 110 on behalf of one or more application operators 120.

The code snippet management engine 320 manages the code snippets 144 and receives data from the code snippets 144. In some embodiments, a version of the code snippet 144 may be a background applet that tracks users' actions in the e-commerce system provided in the application 142. For example, each product or category page of the e-commerce system may be associated with a product, variant, and/or category identifier assigned by application builder platform 130 as discussed in the order and inventory backend 210 in FIG. 2A. Those identifiers may be generally referred to as item identifiers. For an item page in the application 142, the item identifier corresponding to the item may be included in the HTML code or the URL of the item page. The code snippet 144 may parse the item identifier as the end user visits a page and transmit the item identifier to the code snippet management engine 320. As such, the code snippet 144 may be used to track various user actions including viewing a product page, adding an item to a shopping cart, beginning to check out, completing a transaction, etc. Based on preapproval by the end user, the code snippet 144 may transmit the information of the user action to the code snippet management engine 320.

Additionally, or alternatively, in some embodiments, the code snippet 144 may maintain one or more active user interface elements intended for display in the application 142, such as in the form of a popup. The code snippet 144 may receive a message from the message management platform 110 including configuration data for the message. The code snippet 144 may cause the application 142 to display the message. This may be used for in-app promotional content and personal content for the application 142.

The cookie management engine 325 installs and manages various cookies 146 in user computing devices 140. A cookie 146 may be installed on a user computing device 140 through an approval process. The approval process may vary depending on embodiments and situations. For example, the approval may take the form of an end user affirmatively selecting subscription of contents from the application operator 120, via clicking a message or responding to a text message such as an SMS message. In another case, the approval may take the form of an end user authorizing the use of cookies. In some embodiments, when a user opens an application 142 that has the code snippet 144 installed, the code snippet 144 communicates to the message management platform 110 to see if there is a cookie already installed at the user computing device 140. If not, the code snippet management engine 320 may generate a random string that can be incorporated as part of the cookie 146 and send the random string to the user computing device 140. In turn, the user approves the cookie 146 and the cookie is generated and stored in the user computing device 140. The random string may be used as an identifier or a part of the identifier for a user computing device 140. In communicating with the message management platform 110, code snippet 144 may refer to one or more identifiers of the cookie 146 as an identification source for a particular user computing device 140. The event management engine 330 manages and stores events associated with the users, user computing devices 140, and applications 142. The events may be transmitted directly from the user computing devices 140, the application operators 120, the code snippets 144 that are installed in user computing device 140, and API notifications, such as webhook notifications, of the application builder platform 130. In one embodiment, the message management platform 110 may receive an API notification from the application builder platform 130 that includes a customer identifier 282 in the payload 250. The event management engine 330 may match the customer identifier 282 of the application builder platform 130 to the subscriber identifier 310 to determine the end user or a particular user computing device 140 that is related to the event described in the API notification. The event management engine 330 may store the event along with other data describing the user.

An event notification may also be transmitted from a code snippet 144 of an application 142. For example, the code snippet 144 may track the actions of the end user in browsing or purchasing on an e-commerce application 142. The code snippet 144 may transmit notifications to the message management platform 110 describing the actions taken by the user and the products that are associated with the actions. The event management engine 330 stores the events and also determines if an event matches a trigger condition in a message flow specified by the application operator 120.

Events managed by the event management engine 330 may be of any suitable nature. In some cases, the events may be related to actions taken by an end user in using an application 142. For example, the actions can be visiting a product page, subscribing to certain types of information, beginning to check out, completing a checkout, canceling a transaction, etc. The events may also be related to actions taken by a transaction fulfillment operator 150 such as completing an order, placing an order for shipment, delivery of an item, etc. Events may also be related to public events, general events, or events associated with the business of the application operator 120. For example, the events may be a flight delay, a weather issue, or a change in the business of the application operator 120. Events may further be related to the usage of an application 142 such as opening the application, closing the application, and uninstalling the application. Events may further be related to responses provided by the end user such as SMS messages sent from the user.

The instant messaging platform 115 may be a front-end software platform that allows agents of message management platform 110 or an application operator 120 to communicate with users in real-time through a chat session. The instant messaging platform 115 launches the chat session upon prompting from a user, an application operator 120, or an agent of the message management platform 110. For example, the instant messaging platform 115 may launch the chat session in response to a user selecting a user interface element, such as a chat icon. In another example, the instant messaging platform 115 may launch a chat session in response to an application operator 120 or agent of the message management platform 110 requesting to send a promotional message. In some embodiments, the instant messaging platform 115 may use an instant messaging mode, such as SMS, in which an agent is assigned to communicate with the user. A chat session may be maintained or initiated when the user sends the application operator 120 an SMS message through the number that is associated with the application operator 120. In turn, an agent is assigned to the chat to communicate with the user.

The instant messaging platform 115 may display information about the user to the agent. For example, the instant messaging platform 115 may display the past confirmed transactions between the user and the application operator 120, user demographic information from the application builder platform 130, or events associated with the user that have been stored by the event management engine 330. The instant messaging platform 115 may display information about the application operator 120 to the agent, such as available item offerings, promoted items, promotions such as sales or promotional codes, or message style and content requirements. Such displayed information may, for example, help the agent better respond to user requests, make better suggestions to the user, or interact with the user in a way that is consistent with the standards of the application operator 120. In some embodiments, the instant messaging platform 115 may display to the agent a set of items recommended for the user. The set of recommended items may be recommended by a machine learning model 340.

The shopping cart creation engine 335 creates a virtual instance of a shopping cart representation and generates a materialization link of the shopping cart. The materialization link may be transmitted to the user through the instant messaging platform 115 as a message, such as an SMS message that includes a URL. A virtual instance of a shopping cart representation may be a representation of a collection of items in the instant messaging platform 115 that is not built at the application operator 120. The virtual instance of the shopping cart representation may be a set of data, where the set of data comprises data about an item, for example, the ID number, quantity, price, style, or color of the item. The shopping cart creation engine 335 creates the virtual instance of the shopping cart representation by receiving a selection of a set of items from the agent and adding each item in the set of items to the virtual instance of the shopping cart representation. The selected set of items may be based on the chat session with the user or based on the information displayed by the instant messaging platform 115.

Figure 6:
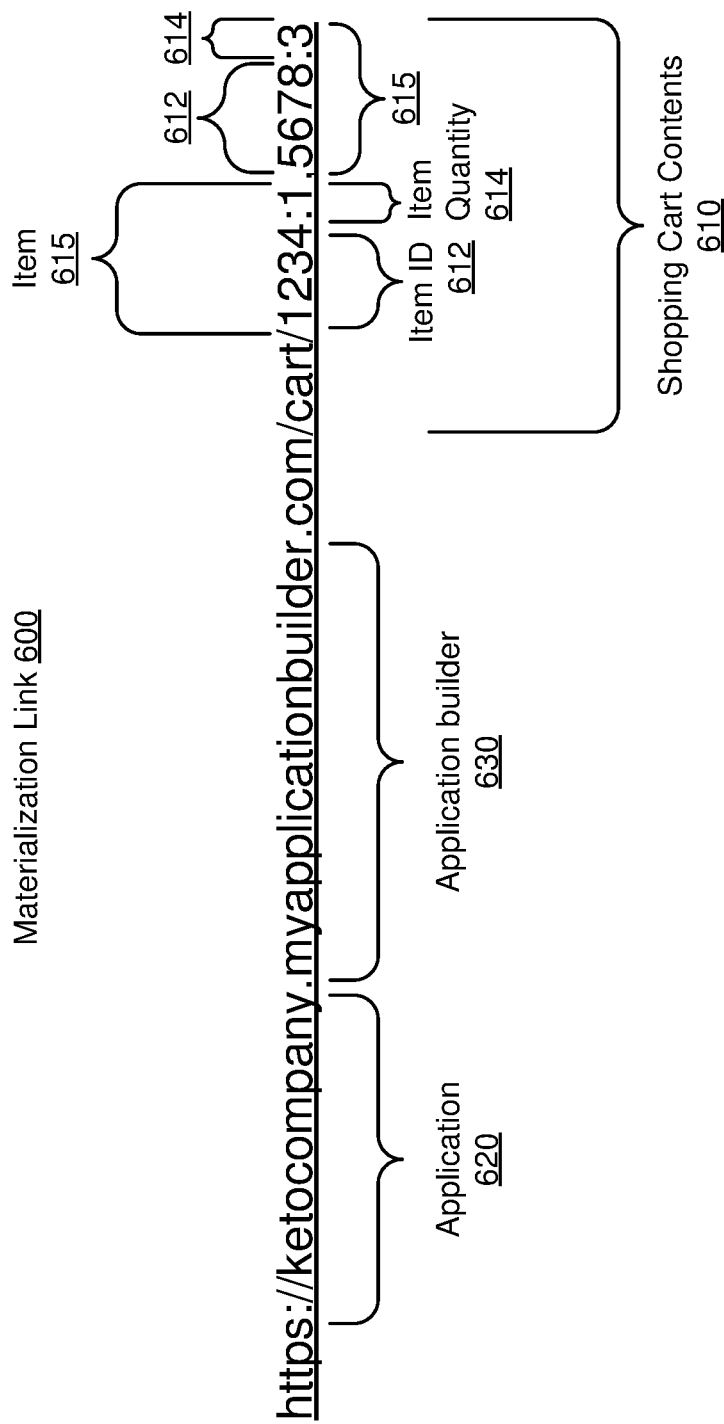
FIG. 6 illustrates an example materialization link, in accordance with some embodiments

The shopping cart creation engine 335 generates a materialization link of the shopping cart. The materialization link is a link (e.g., URL, hyperlink) that, upon an activation from the user, automatically causes a user computing device 140 to reach a landing page of the application 142 of the application operator 120. The landing page has the shopping cart built for the user to complete a checkout process with and, in some embodiments, without requiring further action from the user in addition to the activation. The shopping cart creation engine 335 generates the materialization link of the shopping cart by parsing through the virtual instance of the shopping cart representation and adding each item in the virtual instance of the shopping cart representation to a URL structure. An example URL structure is illustrated in FIG. 6. In some embodiments, the shopping cart creation engine 335 may generate the materialization link by, for each item in the virtual instance of the shopping cart representation, appending item information, such as item ID and item quantity, to the end of a URL link corresponding to the application 142 operated by the application operator 120. For example, each item identifier in the virtual instance of the shopping cart may be appended as a value of a URL parameter. Other descriptors of the item, such as sub-type, color, quantity, size, etc. may be stored as other URL parameters with different key-value pairs. The items may be separated by URL separators. Alternatively, or additionally, the materialization link may include a call of API to the application builder platform 130. The application builder platform 130, by receiving the parameters, materializes the shopping cart in the application operator 120. The shopping cart creation engine 335 generates the materialization link of the shopping cart and allows the link to be transmitted from the agent to the user through the instant messaging platform 115.

The machine learning model 340 receives data including past confirmed transactions of the user, available item offerings of the merchant at the instant messaging platform, and user activity as input and outputs a set of recommended items for the user. The message management platform 110 may train the machine learning model 340 using training sets of items manually labelled with recommended items. The message management platform 110 may train a plurality of models. For example, the message management platform 110 may train models specific to different application operators 120. The message management platform 110 may continually retrain models as new feedback is received. For example, as the instant messaging platform 115 displays recommended items to the agent, it may gather feedback such as whether the agent, based on the chat session with the user, adds a recommended item to the virtual instance of the shopping cart.

Example Information Receival Process

FIG. 4 is a block diagram illustrating types of information the message management platform 110 may receive from the application builder platform 130, the code snippet 144, and/or cookie 146, in accordance with some embodiments. From the application builder platform 130, the message management platform 110 may receive user transaction history 450 (e.g., past confirmed transactions between the user computing device 140 and the application operator 120), user demographics 455 (e.g., user location, age, ID number), or available item offerings 460 (e.g., a list of items that are in stock at the application operated by the application operator 120 within a time window). From the code snippet 144, the message management platform 110 may receive browsing history 465 (e.g., a list of websites the user has visited in a time window) or an action notification 470 (e.g., a notification that a user has clicked a button or viewed a webpage). Similarly, for the cookie 146, the message management platform 110 may receive browsing history 475 or an action notification 480. The instant messaging platform 115 of the message management platform 110 may transmit the information 485 to an agent 490.

Example Event Trigger Message Process

Figure 5A:
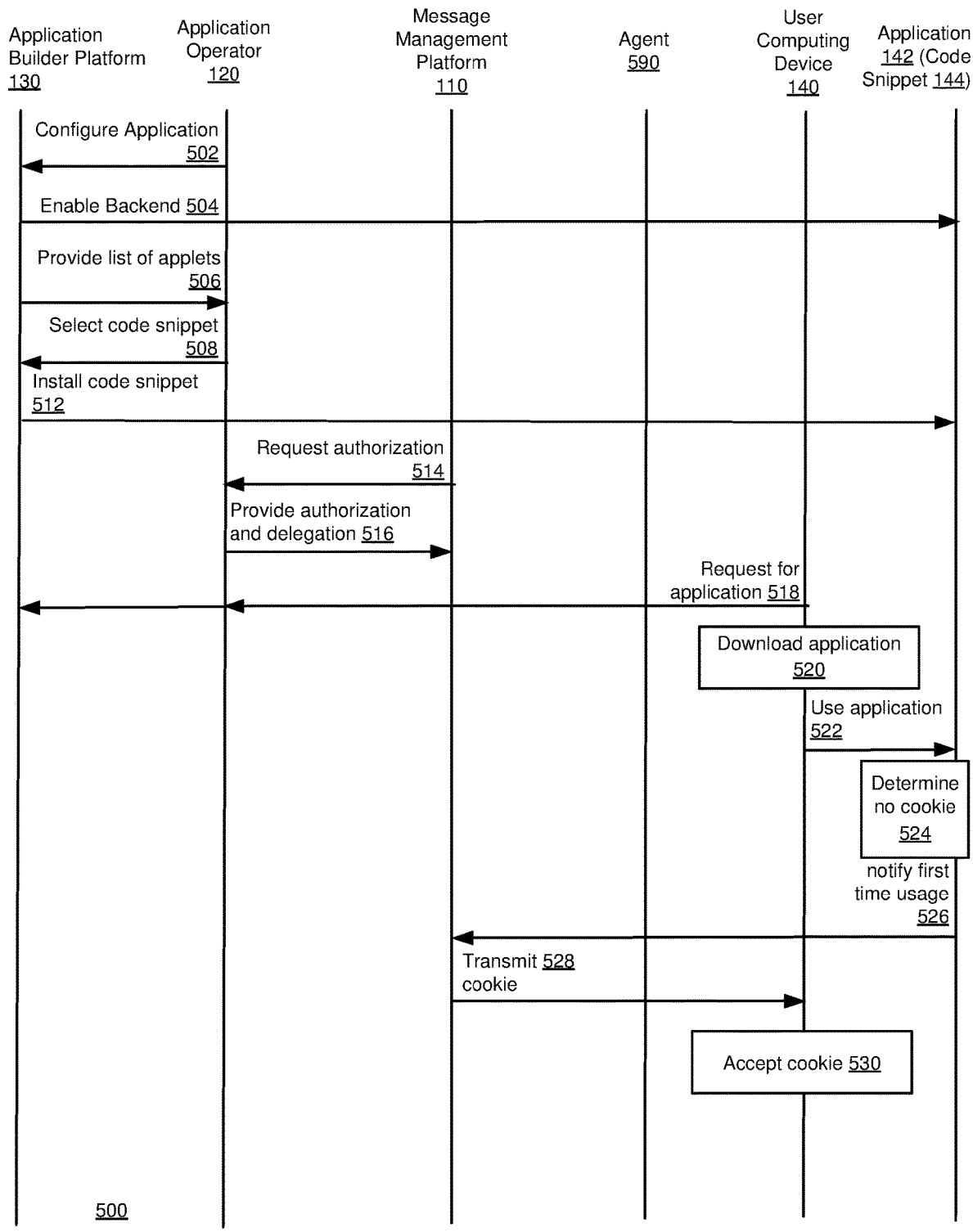
FIG. 5A-B are sequence diagrams illustrating an example series of interactions among entities of the system environment to materialize a shopping cart in a message interface, in accordance with some embodiments.
Figure 5B:
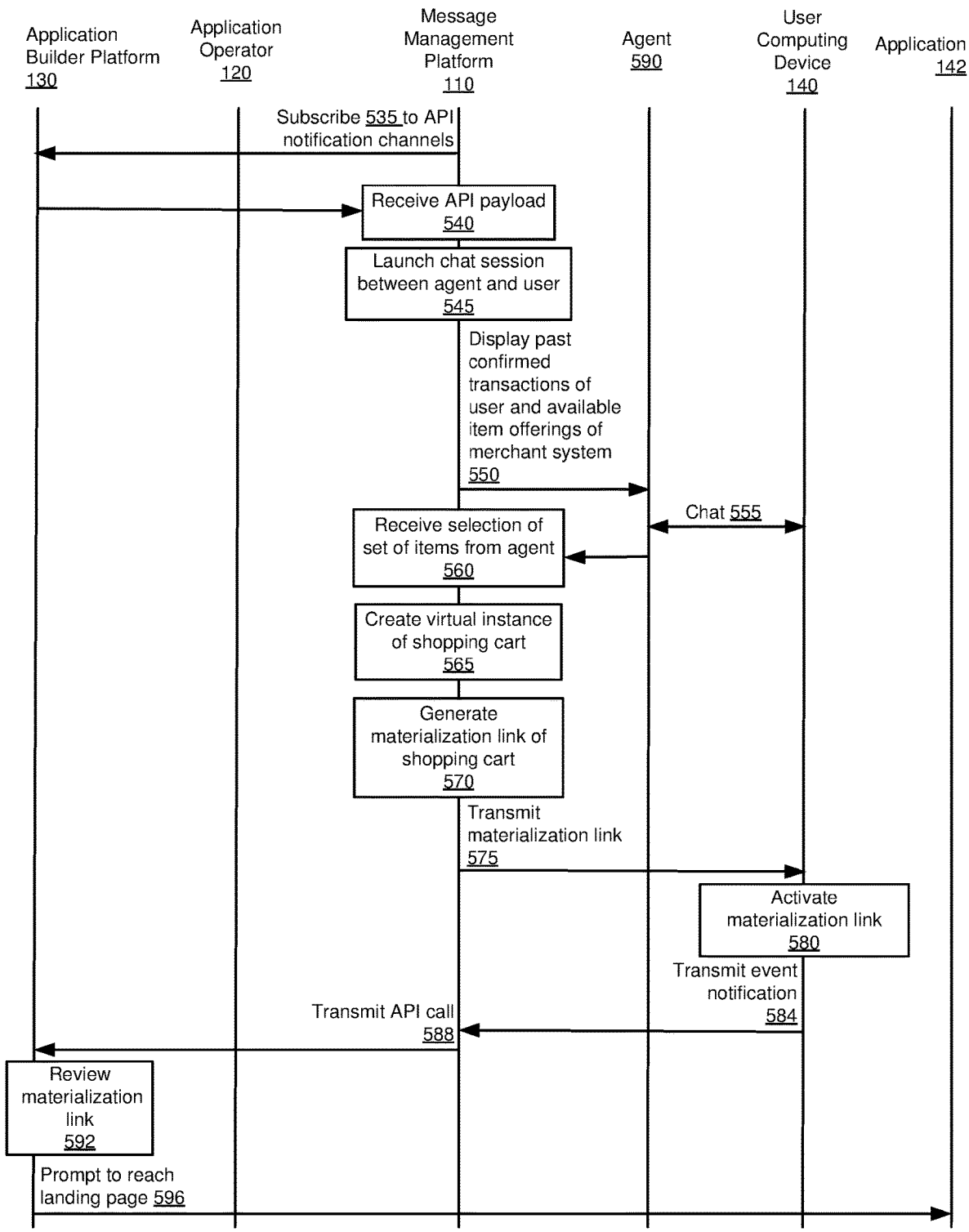

FIGS. 5A and 5B are sequence diagrams illustrating an example series 500 of interactions among entities of the system environment 100 and an agent 590 of the message management platform 110 to materialize a shopping cart in an instant messaging platform, in accordance with some embodiments. The series 500 illustrated in FIG. 5A represents specific sets of instructions that may be stored in one or more computer-readable media, such as memory of different servers. The instructions, when executed by one or more processors of the depicted entities, cause one or more processors to perform the described interactions. As depicted in FIG. 5A, the series 500 is performed by the application builder platform 130, the application operator, the message management platform 110, an agent 590 of the message management platform, the user computing device 140, and the application 142 operated by the application operator 120. The sequence of interactions 500 depicted in FIG. 5A through is merely an example of sequence of interactions, and in other embodiments the sequence of interactions may include fewer, additional, or different actions performed by the same or different entities. While the steps in series 500 are illustrated graphically in FIGS. 5A and 5B as sequences of steps, some of the steps may occur in different sequences than illustrated or may occur concurrently with other steps. Also, while series 500 is depicted as a single series, in various embodiments and situations the series 500 may be further broken down into multiple series.

In the series 500, an application operator 120 may configure 502 an application 142 at the application builder platform 130, such as using the application building platform 205. The design and configuration of the application 142 may include writing backend code using language such as JAVASCRIPT, RUBY ON RAIL, PYTHON, etc., designing front-end elements and pages using HTML and CSS, and incorporating standard features provided by the application builder platform 130 such as the e-commerce functionality and order and inventory backend. The application builder platform 130 may enable 504 the order and inventory backend 210 for the application 142 published by the application operator 120.

The application operator 120 may incorporate additional features to the application 142. For example, the application builder platform 130 may provide 506 a list of applets at the digital distribution platform 215 for the application operator 120 to select and add. In some embodiments, the application operator 120 may select 508 the code snippet 144 published by the message management platform 110. In response, the application builder platform 130 may install 512 the code snippet 144 in the application 142 operated by the application operator 120 by incorporating the code of the code snippet 144 into the code of the application 142.

By selecting the code snippet 144 at the digital distribution platform 215, the message management platform 110 may request 414 the application operator 120 to provide authorization and delegation on certain features and privileges that are possessed by the application operator 120. For example, the application operator 120 may provide 516 authorization to allow code snippet 144 to track user actions on the application 142 and provide 516 delegation for the distribution of messages to end users to the message management platform 110. The application operator 120 may also provide authorization and credentials to the message management platform 110 for the message management platform 110 to subscribe to one or more API notification channels provided by the application builder platform 130.

An end user, through his/her user computing device 140, may request 518 for the application 142. The request may take different forms and may be directed to the application operator 120 and/or the application builder platform 130. For example, if the application 142 takes the form of a website, the request may simply be downloading the website. The download request may be directed to the application operator 120 or the application builder platform 130, depending on which party hosts the website. In some embodiments, the application 142 may take the form of a mobile app. In such a case, the request may be an installation request through an app store. Regardless of the form of the application 142, the user computing device 140 may download 520 the application 142.

Upon the user's usage 522 of the application 142, the code snippet 144 may determine 524 that there is no cookie (e.g., cookie 146) issued by the message management platform 110 stored in the user computing device 140. In turn, the code snippet 144 may notify 526 the message management platform 110 that the application 142 is in the first time use of the user computing device 140. The message management platform 110 may generate a random string that may serve as the subscriber identifier or part of the subscriber identifier used in the cookie. The message management platform 110 may transmit 528 the cookie to the user computing device 140. The user, who controls the user computing device 140, may choose to accept 530 the cookie. The part of series 500 depicted in FIG. 5A is completed and message management platform 110 may now be authorized to track the user's actions using the code snippet 144.

Referring now to FIG. 5B, the message management platform 110 may subscribe 535 to one or more API notification channels of the application builder platform 130 on behalf of the application operator 120. The subscription step 535 may occur any time after the application operator 120 provides authorization in step 516.

The message management platform 110 may receive 540, from an application builder platform 130, an API payload. The API payload comprises of past confirmed transactions carried out by the application builder platform 130 and available item offerings of the application operator 120.

The message management platform 110 may launch 545 a chat session between an agent associated with the message management platform 110 and a user of a user computing device 140 and display 550, to an agent 590 associated with the message management platform 110, information about the user or the application 142. For example, the message management platform 110 may display 550 the user's order history, display 550 items on sale at the application 142, or display a set of recommended items (which may be selected based on various algorithm, such as by the machine learning model 340) personalized to the user.

The agent 590 may chat 555 with the user of the user computing device 140. For example, the user may ask the agent 590 to assist in an online ordering process or to add items to the user's shopping cart. In another example, the agent 590 may reach out via instant messaging to alert the user about promotions of the application 142 or a change in item availability (e.g., an item being back in stock).

The message management platform 110 may receive 560 a selection of a set of items from the agent 590. For example, the agent 590 may add an item specifically requested by the user. In another example, a user may ask the agent 590 to put together a shopping cart with items the user might like. The agent 590 may add a set of items based on the information displayed in the message management platform 110.

The message management platform 110 may create 565 a virtual instance of a shopping cart representation and may generate 570 a materialization link of the shopping cart. The message management platform 110 may be prompted to create 565 the virtual instance of the shopping cart by the agent 590 or the user of the user computing device 140 (e.g., if the agent 590 clicks a button in the message management platform 110, or if the user replies affirmatively to a prompt in the chat session). Upon generating 570 the materialization link, the message management platform 110 may transmit 575 the materialization link of the shopping cart to the user computing device 140.

The user computing device 140 may activate the materialization link 580 (e.g., clicking on the link). In response to the activation of the materialization link, the user computing device 140 transmits an event notification 584 to the message management platform 110, notifying the message management platform 110 that user has activated the link. The message management platform transmits an API call 588 to application builder platform 130. The application builder platform reviews the parameters in the materialization link 592 and prompts the user computing device 596 to reach a landing page of the application 142 of the application operator 120 corresponding to the parameters in the materialization link, wherein the landing page that has the shopping cart built for the user to complete a checkout process with, without requiring further action from the user in addition to the activation.

Example Materialization Link

FIG. 6 illustrates an example materialization link, in accordance with some embodiments. Upon activation by the user, the materialization link automatically causes the user computing device of the user to reach a landing page of the application, wherein the landing page has the shopping cart built for the user to complete a checkout process with. In this example, materialization link 600 is a URL made up of three components: application 620, application builder 630, and shopping cart contents 610. Application 620 and application builder 630 make up the domain of the URL. Application 620 is the name of the application operated by the application operator (e.g., the name of application 142 operated by application operator 120), or the website, that, upon activation, materialization link 600 will redirect to a landing page of. In this example, application 620 is "ketocompany." Application builder 630 is name of the application builder platform (e.g., application builder platform 130). In this example, application builder 630 is "myapplicationbuilder." Shopping cart contents 610 comprises items 615. In this example, as there are two items 615 included at the end of materialization link 600, materialization link 600 will, upon activation, direct the user to a shopping cart containing two items. The item 615 comprises item ID 612 and item quantity 614. The first item 615 in the example has "1234" as item ID 612 and "1" as item quantity 614, specifying that, upon activation of materialization link 600, the shopping cart will contain "1" item with the ID "1234." The second item 615 in the example has "5678" as item ID 612 and "3" as item quantity 614, specifying that, upon activation of materialization link 600, the shopping cart will contain "3" items with the ID "5678."

While FIG. 6 illustrates one possible format of a materialization link that includes parameters representing items in the shopping cart, other suitable formats are also possible in various embodiments. For example, a materialization link may also be an API call to a merchant server that causes the server to generate the actual instance of the shopping cart. A materialization link may have a structure different from the structure of the example materialization link. For example, after a domain and page field, the link may have a "?" indicating the beginning of a query string. The query string may include keys-value pairs, where keys and values are separated by "=" and pairs are separated by "&." A materialization link that follows this structure may look like "https//www.domain.com/page?key1=value1&key2=value2".

Example Instant Messaging Platform User Interface for User

FIG. 7 shows an example instant messaging platform user interface for the user. In this example, the instant messaging platform is an SMS platform and the SMS interaction is between the agent of the message management platform 110 and the user of the user computing device 140, wherein the user is a customer of the application 750, "Keto Company." SMS platform 700 includes user messages 710 and agent messages 720. In this example, the user initiates the interaction with the user message 710 reading, "Hello! I'm looking for a new pre-workout drink from Keto Company. Can you help?" The agent responds to the user with the agent message 720 reading, "Hi Carl! I'm Dan, and I'll be assisting you." The agent and user may exchange messages back and forth through SMS platform 700. The agent may send an agent message 720 including item details 740 (e.g., an image of the item, item size, flavor, and item ID). The agent may send an agent message 720 including a materialization link 730, which, upon activation by the user, automatically causes the user computing device 140 of the user to reach a landing page of the application 750 of the application operator 120, wherein the landing page has the shopping cart built for the user to complete a checkout process with, without requiring further action from the user in addition to the activation.

Example Instant Messaging Platform User Interface for Agent

Figure 8A:
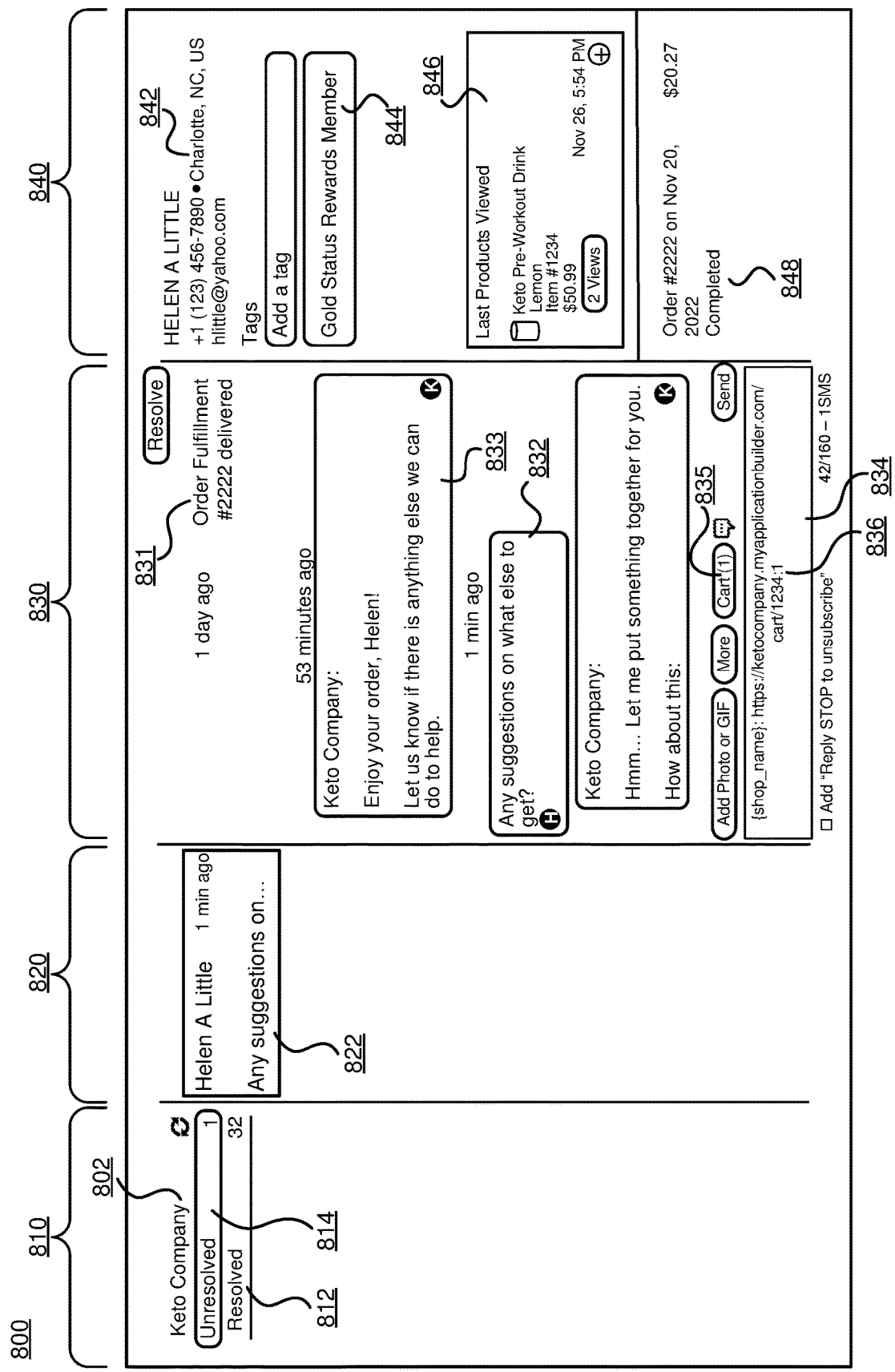
FIG. 8A illustrates an example instant messaging platform user interface viewable by the agent of the message management platform, in accordance with some embodiments.

FIG. 8A illustrates an example instant messaging platform user interface that may be viewable by the agent of the message management platform. The example user interface 800 for an agent of application operator 802 includes four sections: a chat overview window 810, a message list window 820, a chat window 830, and a user information window 840. The chat overview window 810 may include an overview of all chats the agent may be assigned to, including both resolved chats 812, where a conversation between the agent and the user is complete (i.e., user requests have been responded to), and unresolved chats 814. The message list window 820 may include the set of message threads 822 in the selected group (in this case, the selected group is of unresolved chats 814). Chat window 830 may display the selected message thread (in this case, the message thread 822 from the user, Helen A Little). The chat window 830 may display updates on past orders 831, messages from the user 832, and messages from the agent 833. The chat window includes a chat bar 834 for the agent to type a message to the user. Upon clicking the cart button 835, the instant messaging system may launch a window, shown in FIG. 8B, where the agent may select items to add to a cart, which is automatically turned into a materialization link 836 of the shopping cart. The user information window 840 contains information about the user, such as demographic information 842, user tags 844, information on events such as the last products viewed by the user 846, or the user's order history 848.

Figure 8B:
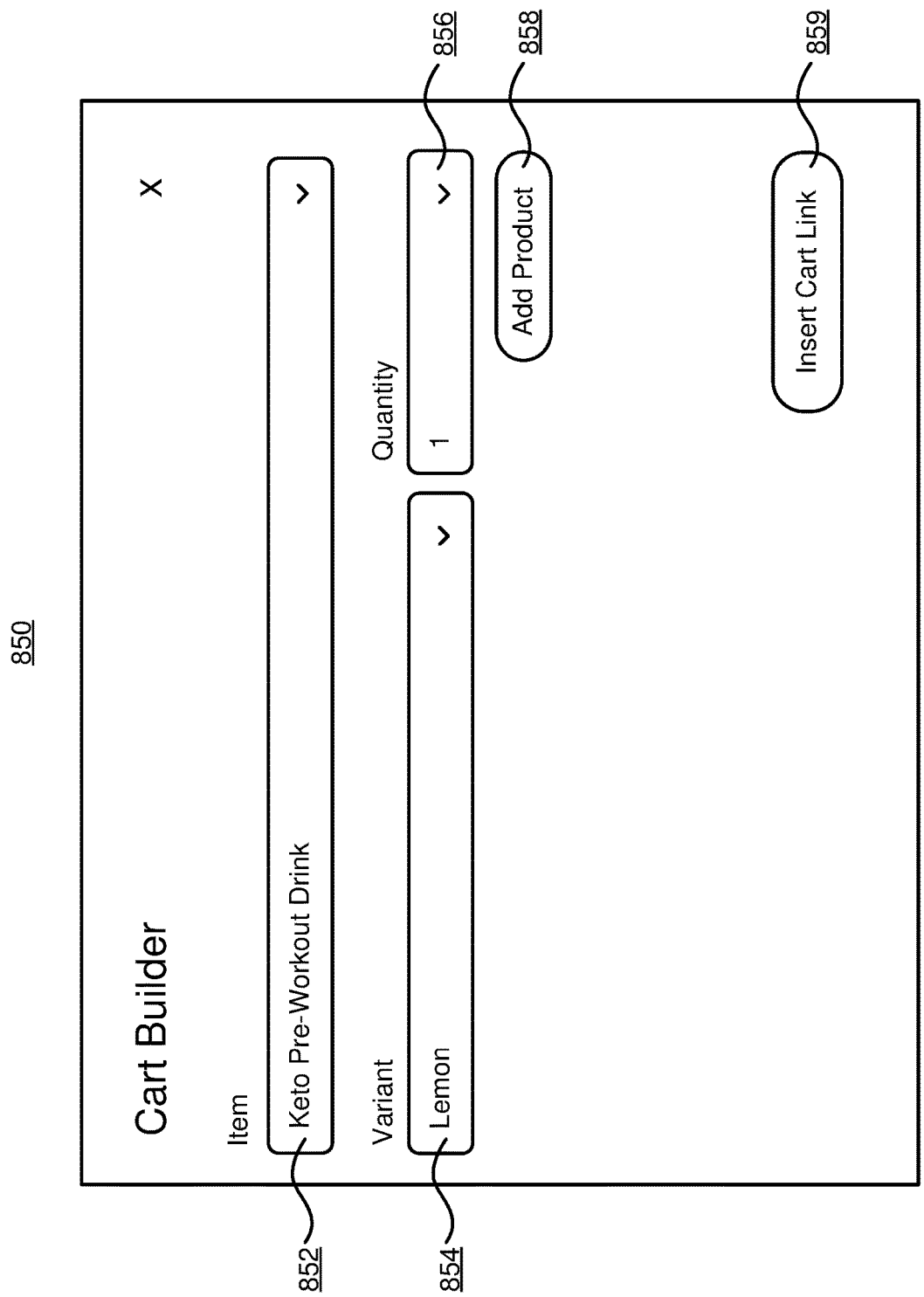
FIG. 8B illustrates a cart builder window, viewable by the agent of the message management platform in accordance with some embodiments.
Figure 9:
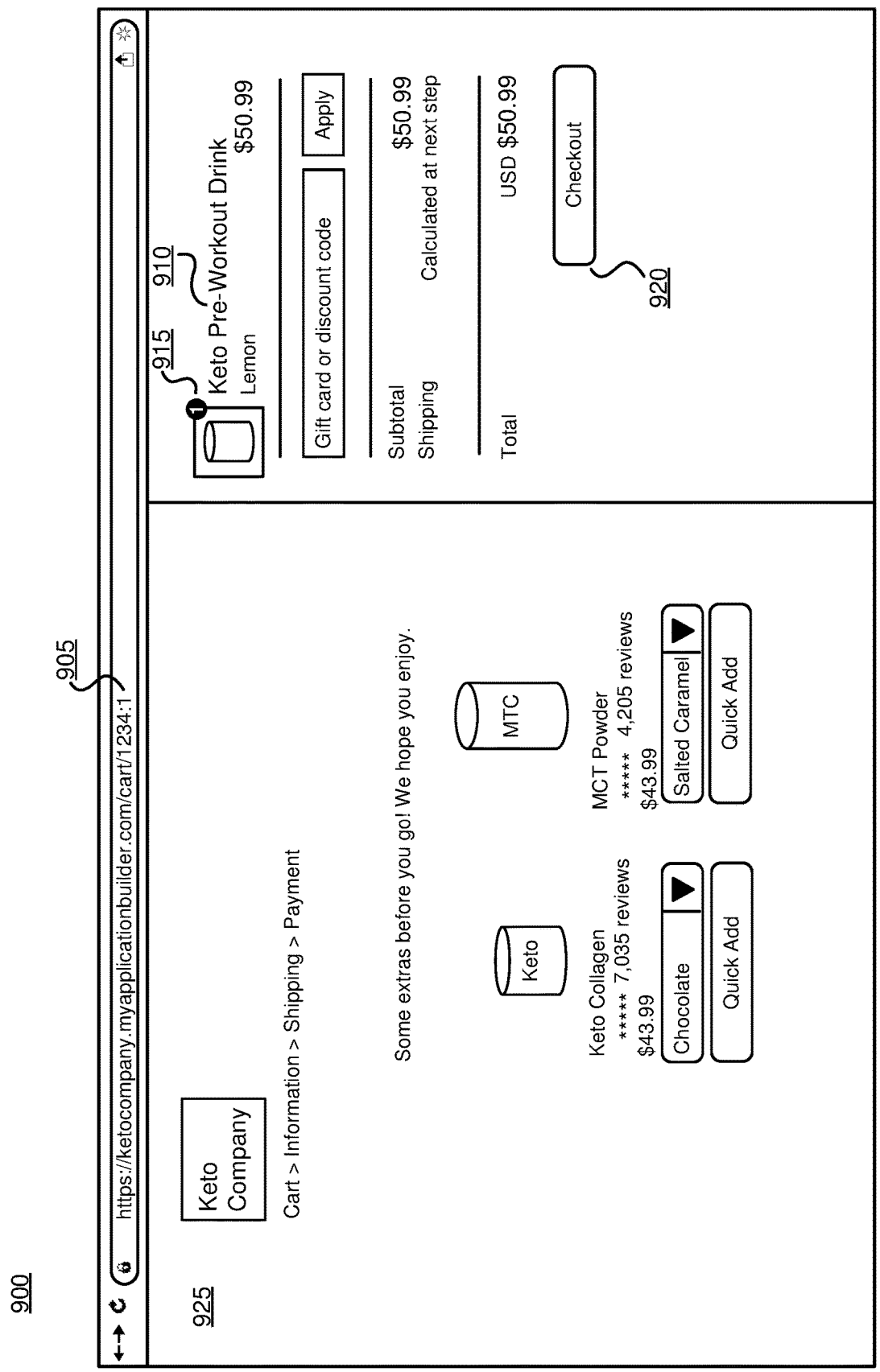
FIG. 9 illustrates an example landing page that the materialization link, upon activation from the user, automatically causes the user computing device to reach, in accordance with some embodiments.

FIG. 8B illustrates a cart builder window 850, viewable by the agent of the message management platform responsive to selecting the cart button 835. In the cart builder window, the agent may select the item 852. The agent may select the item 852 by selecting from a dropdown menu, as shown in this example, or in other ways such as through a search bar where an agent may input item name or item ID. In this example, the item 852 is "Keto Pre-Workout Drink." The agent may select the item variant 854, such as item size, color, or flavor depending on the item. In this example, the item variant 854 is "Lemon." The agent may select the item quantity 856. The agent may select the add product button 858 to add the product to a virtual representation of the shopping cart and repeat the process of selecting an item, variant, and quantity to add an additional product. When the agent is done creating the cart, the agent may select the insert cart link button 859 to generate a materialization link 836 to be added to the chat bar 834 and sent to the user. Example Landing Page FIG. 9 illustrates an example landing page that the materialization link, upon activation from the user, automatically causes the user computing device to reach. In this example, materialization link 905 causes the user computing device to reach the landing page 900. The landing page 900 shows the item 910 and quantity 915 corresponding to the item and quantity in the materialization link 905. The landing page includes a checkout button 920 for the user to use if they wish to checkout with the items 910 shown on the landing page 900. The landing page 900 may show extra information 925, including text and image content from the application operator. In this example, extra information 925 includes a message from the application operator, "Some extras before you go! We hope you enjoy," items the application operator 120 recommends, and buttons for the user to add those items to the cart.

Computing Machine Architecture

Figure 10:
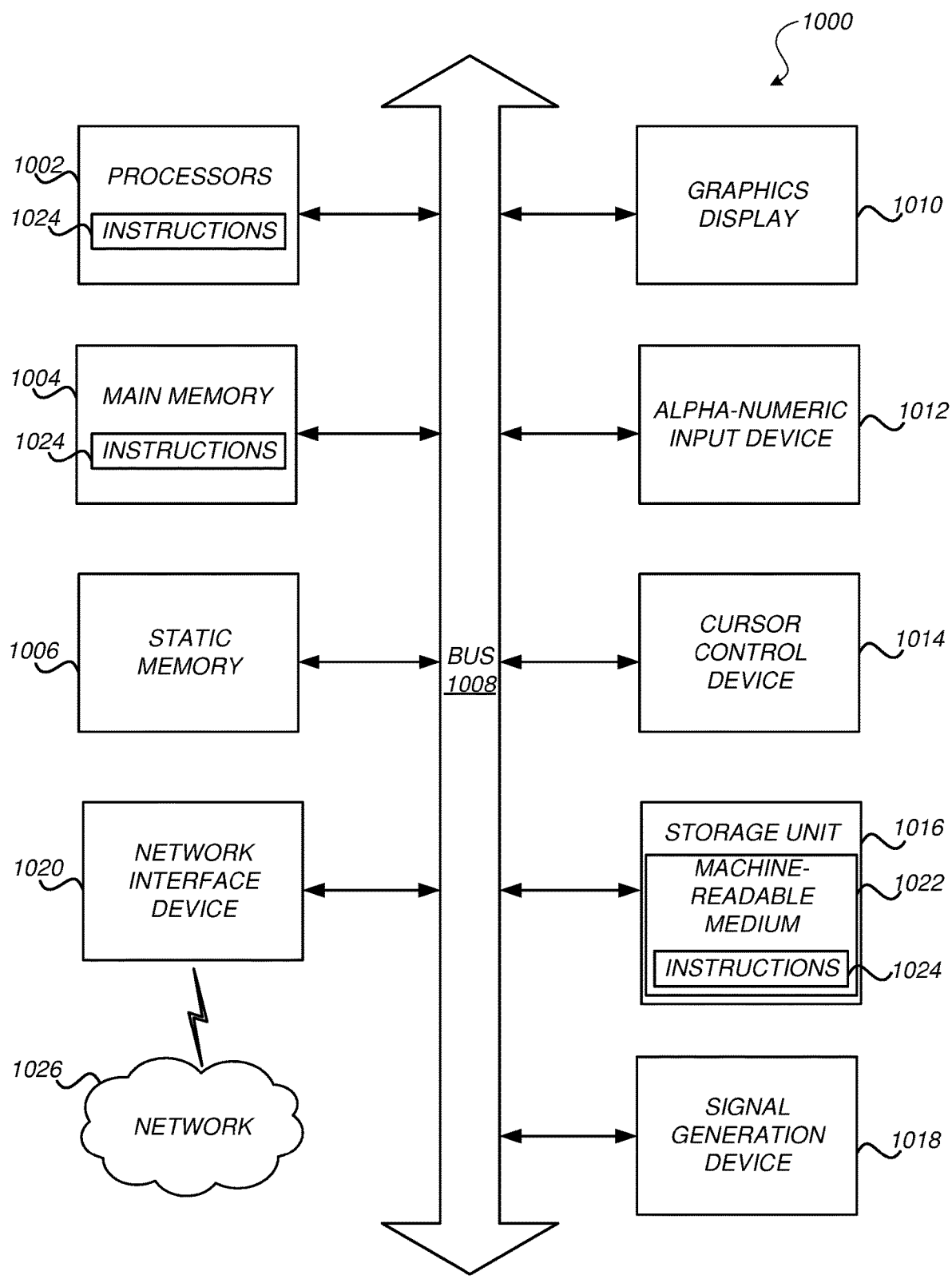
FIG. 10 is a block diagram illustrating components of an example computing machine, in accordance with some embodiments.

FIG. 10 is a block diagram illustrating components of an example computing machine that is capable of reading instructions from a computer-readable medium and execute them in a processor (or controller). A computer described herein may include a single computing machine shown in FIG. 10, a virtual machine, a distributed computing system that includes multiples nodes of computing machines shown in FIG. 10, or any other suitable arrangement of computing devices.

By way of example, FIG. 10 shows a diagrammatic representation of a computing machine in the example form of a computer system 1000 within which instructions 1024 (e.g., software, source code, program code, bytecode, or machine code), which may be stored in a computer-readable medium for causing the machine to perform any one or more of the processes discussed herein may be executed. In some embodiments, the computing machine operates as a stand-alone device or may be connected (e.g., networked) to other machines. In a networked deployment, the machine may operate in the capacity of a server machine or a client machine in a server-client network environment, or as a peer machine in a peer-to-peer (or distributed) network environment.

The structure of a computing machine described in FIG. 10 may correspond to any software, hardware, or combined components shown in FIGS. 1, 2A and 3, including but not limited to, the message management platform 110, the application builder platform 130, the user computing device 140 and various engines, interfaces, terminals, and machines shown in FIG. 3. While FIG. 10 shows various hardware and software elements, each of the components described in FIG. 1, FIG. 2A, and FIG. 3 may include additional or fewer elements. Further, the instructions may correspond to the functionality of components and interfaces described with FIGS. 1-9.

By way of example, a computing machine may be a personal computer (PC), a tablet PC, a set-top box (STB), a personal digital assistant (PDA), a cellular telephone, a smartphone, a web appliance, a network router, an internet of things (IoT) device, a switch or bridge, or any machine capable of executing instructions 1024 that specify actions to be taken by that machine. Further, while only a single machine is illustrated, the term "machine" and "computer" may also be taken to include any collection of machines that individually or jointly execute instructions 1024 to perform any one or more of the methodologies discussed herein.

The example computer system 1000 includes one or more processors 1002 such as a CPU (central processing unit), a GPU (graphics processing unit), a TPU (tensor processing unit), a DSP (digital signal processor), a system on a chip (SOC), a controller, a state machine, an application-specific integrated circuit (ASIC), a field-programmable gate array (FPGA), or any combination of these. Parts of the computing system 1000 may also include a memory 1004 that store computer code including instructions 1024 that may cause the processors 1002 to perform certain actions when the instructions are executed, directly or indirectly by the processors 1002. Instructions can be any directions, commands, or orders that may be stored in different forms, such as equipment-readable instructions, programming instructions including source code, and other communication signals and orders. Instructions may be used in a general sense and are not limited to machine-readable codes.

One and more methods described herein improve the operation speed of the processors 1002 and reduces the space required for the memory 1004. For example, the methods described herein reduce the complexity of the computation of the processors 1002 by applying one or more novel techniques that simplify the steps in training, reaching convergence, and generating results of the processors 1002. The algorithms described herein also reduces the size of the models and datasets to reduce the storage space requirement for memory 1004.

The performance of certain of the operations may be distributed among the more than processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations. Even though in the specification or the claims may refer some processes to be performed by a processor, this should be construed to include a joint operation of multiple distributed processors.

The computer system 1000 may include a main memory 1004, and a static memory 1006, which are configured to communicate with each other via a bus 1008. The computer system 1000 may further include a graphics display unit 1010 (e.g., a plasma display panel (PDP), a liquid crystal display (LCD), a projector, or a cathode ray tube (CRT)). The graphics display unit 1010, controlled by the processors 1002, displays a GUI (GUI) to display one or more results and data generated by the processes described herein. The computer system 1000 may also include an alphanumeric input device 1012 (e.g., a keyboard), a cursor control device 1014 (e.g., a mouse, a trackball, a joystick, a motion sensor, or another pointing instrument), a storage unit 1016 (a hard drive, a solid state drive, a hybrid drive, a memory disk, etc.), a signal generation device 1018 (e.g., a speaker), and a network interface device 1020, which also are configured to communicate via the bus 1008.

The storage unit 1016 includes a computer-readable medium 1022 on which is stored instructions 1024 embodying any one or more of the methodologies or functions described herein. The instructions 1024 may also reside, completely or at least partially, within the main memory 1004 or within the processor 1002 (e.g., within a processor's cache memory) during execution thereof by the computer system 1000, the main memory 1004 and the processor 1002 also constituting computer-readable media. The instructions 1024 may be transmitted or received over a network 1026 via the network interface device 1020.

While computer-readable medium 1022 is shown in an example embodiment to be a single medium, the term "computer-readable medium" should be taken to include a single medium or multiple media (e.g., a centralized or distributed database, or associated caches and servers) able to store instructions (e.g., instructions 1024). The computer-readable medium may include any medium that is capable of storing instructions (e.g., instructions 1024) for execution by the processors (e.g., processors 1002) and that causes the processors to perform any one or more of the methodologies disclosed herein. The computer-readable medium may include, but not be limited to, data repositories in the form of solid-state memories, optical media, and magnetic media. The computer-readable medium does not include a transitory medium such as a propagating signal or a carrier wave.

Example Machine Learning Models

In various embodiments, a wide variety of machine learning techniques may be used. Examples include different forms of supervised learning, unsupervised learning, and semi-supervised learning such as decision trees, support vector machines (SVMs), regression, Bayesian networks, and genetic algorithms Deep learning techniques such as neural networks, including convolutional neural networks (CNN), recurrent neural networks (RNN) and long short-term memory networks (LSTM), may also be used. For example, the displaying of information about the user to the agent performed by the instant messaging platform 115 and other processes may apply one or more machine learning and deep learning techniques.

In various embodiments, the training techniques for a machine learning model may be supervised, semi-supervised, or unsupervised. In supervised learning, the machine learning models may be trained with a set of training samples that are labeled. For example, for a machine learning model trained to receive data including past confirmed transactions of the user, available item offerings of the merchant at the instant messaging platform, and user activity as input and output a set of recommended items for the user, the training samples may be items manually labelled with recommended items or item-recommended-item pairs, labelled by a confidence level of the recommendation. The labels for each training sample may be binary or multi-class. In training a machine learning model for item recommendations, the training labels may include a positive label that indicates a recommended item or that an item is recommended to a user based on the received data and a negative label that indicates an item that is not recommended or that an item is not recommended to a user based on the received data. In some embodiments, the training labels may also be multi-class such as labels indicating varying confidence in the item recommendation.

By way of example, the training set may include multiple past records [items, purchase history] with known outcomes. Each training sample in the training set may correspond to a past and the corresponding outcome may serve as the label for the sample. A training sample may be represented as a feature vector that include multiple dimensions. Each dimension may include data of a feature, which may be a quantized value of an attribute that describes the past record. For example, in a machine learning model that is used to produce item recommendations, the features in a feature vector may include features of the item, such as item size, item color, item type, item price, etc. In various embodiments, certain pre-processing techniques may be used to normalize the values in different dimensions of the feature vector.

In some embodiments, an unsupervised learning technique may be used. The training samples used for an unsupervised model may also be represented by features vectors, but may not be labeled. Various unsupervised learning technique such as clustering may be used in determining similarities among the feature vectors, thereby categorizing the training samples into different clusters. In some cases, the training may be semi-supervised with training set having a mix of labeled samples and unlabeled samples.

A machine learning model may be associated with an objective function, which generates a metric value that describes the objective goal of the training process. The training process may intend to reduce the error rate of the model in generating predictions. In such a case, the objective function may monitor the error rate of the machine learning model. In a model that generates predictions, the objective function of the machine learning algorithm may be the training error rate when the predictions are compared to the actual labels. Such an objective function may be called a loss function. Other forms of objective functions may also be used, particularly for unsupervised learning models whose error rates are not easily determined due to the lack of labels. In some embodiments, in producing item recommendations, the objective function may correspond to the error rate when predictions are compared to actual labels, based on if the recommended item is purchased or not purchased after it has been recommended by the agent to the user. In various embodiments, the error rate may be measured as cross-entropy loss, L1 loss (e.g., the sum of absolute differences between the predicted values and the actual value), L2 loss (e.g., the sum of squared distances).

Figure 11:
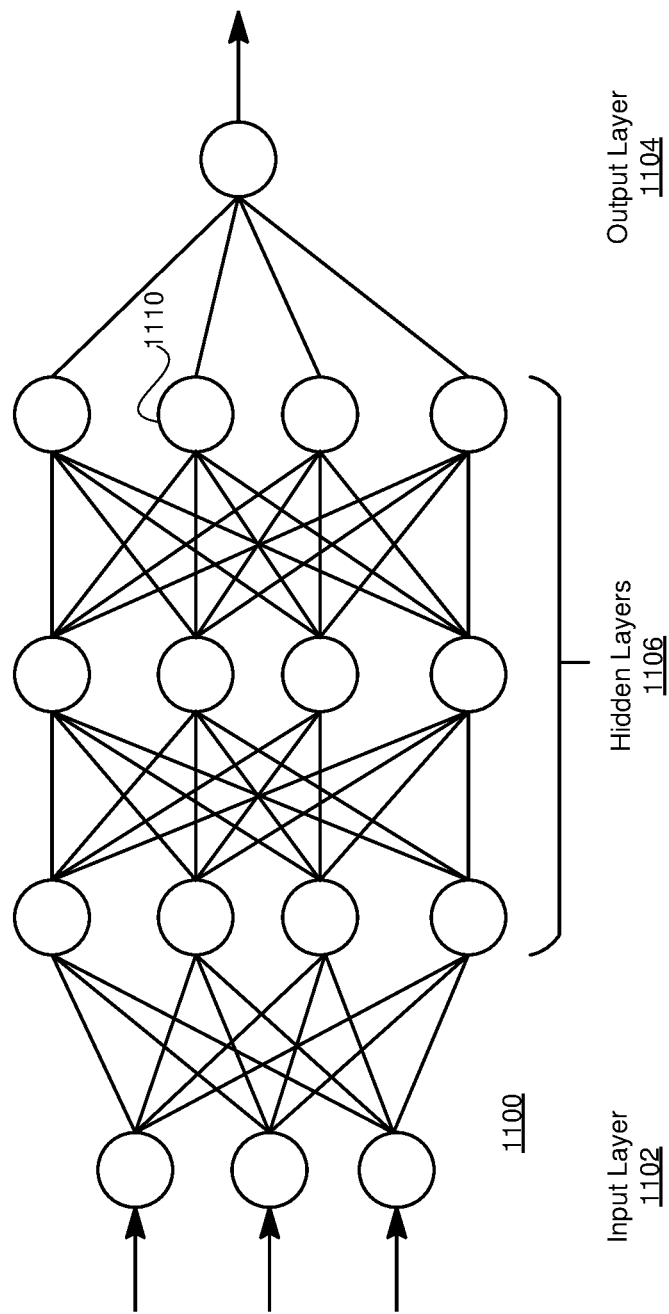
FIG. 11 illustrates an example neural network, in accordance with some embodiments.

Referring to FIG. 11, a structure of an example neural network is illustrated, in accordance with some embodiments. The neural network 1100 may receive an input and generate an output. The input may be the feature vector of a training sample in the training process and the feature vector of an actual case when the neural network is making an inference. The output may be the prediction, classification, or another determination performed by the neural network. The neural network 1100 may include different kinds of layers, such as convolutional layers, pooling layers, recurrent layers, fully connected layers, and custom layers. A convolutional layer convolves the input of the layer (e.g., an image) with one or more kernels to generate different types of images that are filtered by the kernels to generate feature maps. Each convolution result may be associated with an activation function. A convolutional layer may be followed by a pooling layer that selects the maximum value (max pooling) or average value (average pooling) from the portion of the input covered by the kernel size. The pooling layer reduces the spatial size of the extracted features. In some embodiments, a pair of convolutional layer and pooling layer may be followed by a recurrent layer that includes one or more feedback loop. The feedback may be used to account for spatial relationships of the features in an image or temporal relationships of the objects in the image. The layers and may be followed in multiple fully connected layers that have nodes connected to each other. The fully connected layers may be used for classification and object detection. In one embodiment, one or more custom layers may also be presented for the generation of a specific format of output. For example, a custom layer may be used for image segmentation for labeling pixels of an image input with different segment labels.

The order of layers and the number of layers of the neural network 1100 may vary in different embodiments. In various embodiments, a neural network 1100 includes one or more layers 1102, 1104, and 1106, but may or may not include any pooling layer or recurrent layer. If a pooling layer is present, not all convolutional layers are always followed by a pooling layer. A recurrent layer may also be positioned differently at other locations of the CNN. For each convolutional layer, the sizes of kernels (e.g., 3×3, 5×5, 7×7, etc.) and the numbers of kernels allowed to be learned may be different from other convolutional layers.

A machine learning model may include certain layers, nodes 1110, kernels and/or coefficients. Training of a neural network, such as the NN 1100, may include forward propagation and backpropagation. Each layer in a neural network may include one or more nodes, which may be fully or partially connected to other nodes in adjacent layers. In forward propagation, the neural network performs the computation in the forward direction based on outputs of a preceding layer. The operation of a node may be defined by one or more functions. The functions that define the operation of a node may include various computation operations such as convolution of data with one or more kernels, pooling, recurrent loop in RNN, various gates in LSTM, etc. The functions may also include an activation function that adjusts the weight of the output of the node. Nodes in different layers may be associated with different functions.

Training of a machine learning model may include an iterative process that includes iterations of making determinations, monitor performance of the machine learning model using the objective function, and backpropagation to adjust the weights (e.g., weights, kernel values, coefficients) in various nodes 1110. For example, a computing device may receive a training set that includes a set of items or a set of item-recommended-item pairs. Each training sample in the training set may be assigned with labels indicating one or more recommended items or the confidence level in the recommendation. The computing device, in a forward propagation, may use the machine learning model to generate predicted a new recommended item. The computing device may compare the predicted recommended item with the labels of the training sample. The computing device may adjust, in a backpropagation, weights of the machine learning model based on the comparison.

By way of example, each of the functions in the neural network may be associated with different coefficients (e.g., weights and kernel coefficients) that are adjustable during training. In addition, some of the nodes in a neural network may also be associated with an activation function that decides the weight of the output of the node in forward propagation. Common activation functions may include step functions, linear functions, sigmoid functions, hyperbolic tangent functions (tanh), and rectified linear unit functions (ReLU). After an input is provided into the neural network and passes through a neural network in the forward direction, the results may be compared to the training labels or other values in the training set to determine the neural network's performance. The process of prediction may be repeated for other samples in the training sets to compute the value of the objective function in a particular training round. In turn, the neural network performs backpropagation by using gradient descent such as stochastic gradient descent (SGD) to adjust the coefficients in various functions to improve the value of the objective function.

Multiple rounds of forward propagation and backpropagation may be performed. Training may be completed when the objective function has become sufficiently stable (e.g., the machine learning model has converged) or after a predetermined number of rounds for a particular set of training samples. The trained machine learning model can be used for producing item recommendations or another suitable task for which the model is trained.

ADDITIONAL CONSIDERATIONS

Beneficially, various embodiments described herein provide integration to application building ecosystem that allows application operators to effectively communicate with the end users of the applications while allowing the application operators to enhance the functionalities of their applications by incorporating various third-party read-to-use features. Various disclosed embodiments allow a message management platform to effectively communicate with any third-party platforms that provide features to the applications and distribute messages based on triggers that occur at the third-party platforms. This streamlines the application building process and enhance communication capability for application operators.

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Embodiments according to the invention are in particular disclosed in the attached claims directed to a method and a computer program product, wherein any feature mentioned in one claim category, e.g., method, can be claimed in another claim category, e.g. computer program product, system, storage medium, as well. The dependencies or references back in the attached claims are chosen for formal reasons only. However, any subject matter resulting from a deliberate reference back to any previous claims (in particular multiple dependencies) can be claimed as well, so that any combination of claims and the features thereof is disclosed and can be claimed regardless of the dependencies chosen in the attached claims. The subject-matter which can be claimed comprises not only the combinations of features as set out in the disclosed embodiments but also any other combination of features from different embodiments. Various features mentioned in the different embodiments can be combined with explicit mentioning of such combination or arrangement in an example embodiment. Furthermore, any of the embodiments and features described or depicted herein can be claimed in a separate claim and/or in any combination with any embodiment or feature described or depicted herein or with any of the features.

Some portions of this description describe the embodiments in terms of algorithms and symbolic representations of operations on information. These operations and algorithmic descriptions, while described functionally, computationally, or logically, are understood to be implemented by computer programs or equivalent electrical circuits, microcode, or the like. Furthermore, it has also proven convenient at times, to refer to these arrangements of operations as engines, without loss of generality. The described operations and their associated engines may be embodied in software, firmware, hardware, or any combinations thereof.

Any of the steps, operations, or processes described herein may be performed or implemented with one or more hardware or software engines, alone or in combination with other devices. In some embodiments, a software engine is implemented with a computer program product comprising a computer-readable medium containing computer program code, which can be executed by a computer processor for performing any or all of the steps, operations, or processes described. The term "steps" does not mandate or imply a particular order. For example, while this disclosure may describe a process that includes multiple steps sequentially with arrows present in a flowchart, the steps in the process do not need to be performed by the specific order claimed or described in the disclosure. Some steps may be performed before others even though the other steps are claimed or described first in this disclosure.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. In addition, the term "each" used in the specification and claims does not imply that every or all elements in a group need to fit the description associated with the term "each." For example, "each member is associated with element A" does not imply that all members are associated with an element A. Instead, the term "each" only implies that a member (of some of the members), in a singular form, is associated with an element A.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights.

The invention claimed is:

1. A computer-implemented method for using an instant messaging platform operated by a message management platform to materialize a shopping cart, the computer-implemented method comprising:

receiving, by an API subscription and data engine at the message management platform, application programming interface (API) payloads from an application builder platform that provides a backend merchant component for an application operator, the API payloads comprising of past confirmed transactions of a user of the application operator, the application operator's user identifier of the user, and available item offerings of the application operator, wherein the message management platform, the application operator, the application builder platform are operated by different entities;

receiving, by a code snippet management system at the message management platform, from a code snippet provided by the message management platform, user activity of the user of the application operator;

determining, by an event management engine at the message management platform, that the user is a subscriber to the message management platform by matching the user identifier of the user to a subscriber identifier of the user;

launching, at the instant messaging platform, a chat session between the user and an agent, wherein the agent is associated with the message management platform;

generating, by a machine learning model at the message management platform, a set of recommended items for the user, the machine learning model trained to receive the past confirmed transactions of the user, the user activity of the user, and the available item offerings of the application operator at the instant messaging platform as input and to output the set of recommended items for the user;

providing, at the instant messaging platform, the past confirmed transactions of the user the available item offerings of the application operator, and the set of recommended items for display to the agent;

creating, by a shopping cart creation engine at the message management platform, a virtual instance of a shopping cart representation, wherein the virtual instance comprises a set of item data, by:
  receiving a selection of a set of items; and
  adding each item in the set of items to the virtual instance of the shopping cart representation;

generating, by a shopping cart creation engine at the message management platform, a materialization link of the shopping cart by adding each item in the virtual instance of the shopping cart representation to a URL structure; and transmitting, through the instant messaging platform, the materialization link of the shopping cart to the user, wherein the materialization link, upon activation, automatically directs to a landing page of the application operator that has shopping cart corresponding to the virtual instance of the shopping cart representation, the landing page allowing the user to complete a checkout process.

2. The computer-implemented method of claim 1, wherein the instant messaging platform is an SMS platform.

3. The computer-implemented method of claim 1, further comprising collecting user activity through an SDK installed at the user computing device, the SDK in communication with the message management platform.

4. The computer-implemented method of claim 1, wherein providing for display, at the instant messaging platform, the past confirmed transactions of the user the available item offerings of the application operator, and the set of recommended items, further comprises providing for display user demographic information, promoted items, promotions, and message style and content requirements.

5. The computer-implemented method of claim 1, wherein the user completes a purchase process using an SMS messaging platform without building any items in a shopping cart interface.

6. A non-transitory computer-readable storage medium configured to store computer code comprising instructions, wherein the instructions, when executed by one or more processors, cause the one or more processors to:
 receive, by an API subscription and data engine at the message management platform, application programming interface (API) payloads from an application builder platform that provides a backend merchant component for an application operator, the API payloads comprising of past confirmed transactions of a user of the application operator, the application operator's user identifier of the user, and available item offerings of the application operator, wherein a message management platform, the application operator, the application builder platform are operated by different entities;
 receive, by a code snippet management system at the message management platform, from a code snippet provided by the message management platform, user activity of the user of the application operator;
 determine, by an event management engine at the message management platform, that the user is a subscriber to the message management platform by matching the user identifier of the user to a subscriber identifier of the user,
 launch, at an instant messaging platform, a chat session between the user and an agent, wherein the agent is associated with the message management platform;
 generate, by a machine learning model at the message management platform, a set of recommended items for the user, the machine learning model trained to receive the past confirmed transactions of the user, the user activity of the user, and the available item offerings of the application operator at the instant messaging platform as input and to output the set of recommended items for the user;
 provide, at the instant messaging platform, the past confirmed transactions of the user the available item offerings of the application operator, and the set of recommended items for display to the agent;
 create, by a shopping cart creation engine at the message management platform, a virtual instance of a shopping cart representation, wherein the virtual instance comprises a set of item data, by:
  receiving a selection of a set of items; and
  adding each item in the set of items to the virtual instance of the shopping cart representation;
 generate, by a shopping cart creation engine at the message management platform, a materialization link of the shopping cart by adding each item in the virtual instance of the shopping cart representation to a URL structure; and
 transmit, through the instant messaging platform, the materialization link of the shopping cart to the user, wherein the materialization link, upon activation, automatically directs the user to a landing page of the application operator that has shopping cart corresponding to the virtual instance of the shopping cart representation, the landing page allowing the user to complete a checkout process.

7. The non-transitory computer-readable storage medium of claim 6, wherein the instant messaging platform is an SMS platform.

8. The non-transitory computer-readable storage medium of claim 6, further comprising instructions that, when executed by the one or more processors, cause the one or more processors to collect user activity through an SDK installed at the user computing device, the SDK in communication with the message management platform.

9. The non-transitory computer-readable storage medium of claim 6, wherein the instruction for providing, at the instant messaging platform, the past confirmed transactions of the user, the available item offerings of the application operator, and the set of recommended items for display to the agent further comprises instructions that, when executed by the one or more processors, cause the one or more processors to provide user demographic information, promoted items, promotions, and message style and content requirements.

10. The non-transitory computer-readable storage medium of claim 9, wherein the user completes a purchase process using an SMS messaging platform without building any items in a shopping cart interface.

11. A system, comprising:
 a computing server comprising one or more processors and memory, the memory configured to store instructions, wherein the instructions, when executed by the one or more processors, cause the one or more processors to:
  receive, by an API subscription and data engine at the message management platform, application programming interface (API) payloads from an application builder platform that provides a backend merchant component for an application operator, the API payloads comprising of past confirmed transactions of a user of the application operator, the application operator's user identifier of the user, and available item offerings of the application operator, wherein a message management platform, the application operator, the application builder platform are operated by different entities;
  receive, by a code snippet management system at the message management platform, from a code snippet provided by the message management platform, user activity of the user of the application operator;
  determine, by an event management engine at the message management platform, that the user is a subscriber to the message management platform by matching the user identifier of the user to a subscriber identifier of the user, launch, at an instant messaging platform, a chat session between the user and an agent, wherein the agent is associated with the message management platform;

generate, by a machine learning model at the message management platform, a set of recommended items for the user, the machine learning model trained to receive the past confirmed transactions of the user, the user activity of the user, and the available item offerings of the application operator at the instant messaging platform as input and to output the set of recommended items for the user;

provide, at the instant messaging platform, the past confirmed transactions of the user the available item offerings of the application operator and the set of recommended items for display to the agent;

create, by a shopping cart creation engine at the message management platform, a virtual instance of a shopping cart representation, wherein the virtual instance comprises a set of item data, by:
receiving a selection of a set of items; and
adding each item in the set of items to the virtual instance of the shopping cart representation;

generate, by a shopping cart creation engine at the message management platform, a materialization link of the shopping cart by adding each item in the virtual instance of the shopping cart representation to a URL structure; and transmit, through the instant messaging platform, the materialization link of the shopping cart to the user, wherein the materialization link, upon activation, automatically directs the user to a landing page of the application operator that has shopping cart corresponding to the virtual instance of the shopping cart representation, the landing page allowing the user to complete a checkout process.

12. The system of claim 11, wherein the instant messaging platform is an SMS platform.

13. The system of claim 11, further comprising instructions that, when executed by the one or more processors, cause the one or more processors to collect user activity through an SDK installed at the user computing device, the SDK in communication with the message management platform.

14. The system of claim 11, wherein the instruction for providing, at the instant messaging platform, the past confirmed transactions of the user, the available item offerings of the application operator, and the set of recommended items for display to the agent further comprises instructions that, when executed by the one or more processors, cause the one or more processors to provide user demographic information, promoted items, promotions, and message style and content requirements.

15. The system of claim 11, wherein a purchase process is completed using an SMS messaging platform without building any items in a shopping cart interface.

16. The computer-implemented method of claim 1, wherein receiving a selection of a set of items comprises receiving a selection of a recommended item.

17. The computer-implemented method of claim 16, further comprising, for a recommended item in the set of recommended items, responsive to receiving a selection of the recommended item, retraining the machine learning model.

18. The non-transitory computer-readable storage medium of claim 6, wherein the instruction for receiving a selection of a set of items comprises instructions that, when executed by the one or more processors, cause the one or more processors to receive a selection of a recommended item.

19. The non-transitory computer-readable storage medium of claim 18, further comprising instructions that, when executed by the one or more processors, cause the one or more processors to, for a recommended item in the set of recommended items, responsive to receiving a selection of the recommended item, retraining the machine learning model.

20. The system of claim 11, wherein the instruction for receiving a selection of a set of items comprises instructions that, when executed by the one or more processors, cause the one or more processors to receive a selection of a recommended item.

\* \* \* \* \*

UNITED STATES PATENT AND TRADEMARK OFFICE
CERTIFICATE OF CORRECTION

PATENT NO. : 11,887,178 B1
APPLICATION NO. : 18/175803
DATED : January 30, 2024
INVENTOR(S) : Turner et al.

It is certified that error appears in the above-identified patent and that said Letters Patent is hereby corrected as shown below:

In the Claims

In Column 28, in Claim 1, Line 49, delete "user" and insert -- user, --, therefor.

In Column 29, in Claim 1, Line 1, delete "has" and insert -- has a --, therefor.

In Column 29, in Claim 4, Line 14, delete "user" and insert -- user, --, therefor.

In Column 29, in Claim 6, Line 60, delete "user" and insert -- user, --, therefor.

In Column 30, in Claim 6, Line 13, delete "has" and insert -- has a --, therefor.

In Column 31, in Claim 11, Line 14, delete "user" and insert -- user, --, therefor.

In Column 31, in Claim 11, Line 15, delete "operator" and insert -- operator, --, therefor.

In Column 31, in Claim 11, Line 33, delete "has" and insert -- has a --, therefor.

Signed and Sealed this
Fifteenth Day of October, 2024

Katherine Kelly Vidal
*Director of the United States Patent and Trademark Office*